US009787738B2

(12) United States Patent
Hix et al.

(10) Patent No.: US 9,787,738 B2
(45) Date of Patent: *Oct. 10, 2017

(54) CLOSED NETWORK VIDEO PRESENTATION

(71) Applicant: Circle Technology, Inc., Vancouver, WA (US)

(72) Inventors: Steven Robert Hix, Camas, WA (US); Edward Winslow King, Brush Prairie, WA (US); Iranpour Khormaei, Vancouver, WA (US); Paul Lewis, Portland, OR (US)

(73) Assignee: Circle Technology, Inc., Vancouver, WA (US)

( * ) Notice: Subject to any disclaimer, the term of this patent is extended or adjusted under 35 U.S.C. 154(b) by 369 days.

This patent is subject to a terminal disclaimer.

(21) Appl. No.: 14/550,831

(22) Filed: Nov. 21, 2014

(65) Prior Publication Data
US 2015/0142925 A1 May 21, 2015

Related U.S. Application Data

(63) Continuation-in-part of application No. 13/921,511, filed on Jun. 19, 2013, now Pat. No. 8,898,449.
(Continued)

(51) Int. Cl.
*G06F 15/16* (2006.01)
*H04L 29/06* (2006.01)
(Continued)

(52) U.S. Cl.
CPC ........... *H04L 65/60* (2013.01); *G06Q 10/101* (2013.01); *H04L 63/0428* (2013.01);
(Continued)

(58) Field of Classification Search
CPC . H04L 65/60; H04L 63/0428; H04L 67/1044; G06Q 10/101; H04N 21/43637;
(Continued)

(56) References Cited

U.S. PATENT DOCUMENTS 8,166,107 B2 4/2012 Makhija et al.
2005/0018686 A1* 1/2005 Igarashi ................ H04W 48/14
370/395.2

(Continued)

OTHER PUBLICATIONS

Gregg Keizer, Unfinished Windows 7 Feature Turns Laptops Into Wi-Fi Hotspots, Oct. 30, 2009, ComputerWorld.*
(Continued)

*Primary Examiner* — Joseph Greene
(74) *Attorney, Agent, or Firm* — Alleman Hall Creasman & Tuttle LLP

(57) ABSTRACT

Systems, methods and computer readable memory devices for delivering a presentation are provided. In one example, a method includes establishing a wireless network access point that creates a closed wireless network. An encrypted communication session is established via the closed wireless network with a plurality of client computing devices that each comprise a display. Each of the client computing devices is communicatively coupled to a virtual network server on the host computing device. A resource locator is sent to the client computing devices, with the resource locator including a network location of an audio/video file stored on the host computing device. A request is received for the resource locator from the client computing devices. In response, audio/video data is streamed from the audio/video file to the plurality of client computing devices.

18 Claims, 20 Drawing Sheets

Related U.S. Application Data

(60) Provisional application No. 61/661,733, filed on Jun. 19, 2012, provisional application No. 61/907,936, filed on Nov. 22, 2013, provisional application No. 62/013,093, filed on Jun. 17, 2014.

(51) Int. Cl.
| | |
|---|---|
| *G06Q 10/10* | (2012.01) |
| *H04L 29/08* | (2006.01) |
| *H04N 21/4363* | (2011.01) |
| *H04N 21/658* | (2011.01) |
| *H04N 21/858* | (2011.01) |
| *H04W 12/08* | (2009.01) |
| *H04W 84/10* | (2009.01) |

(52) U.S. Cl.
CPC ... *H04L 67/1044* (2013.01); *H04N 21/43637* (2013.01); *H04N 21/6581* (2013.01); *H04N 21/8586* (2013.01); *H04W 12/08* (2013.01); *H04W 84/10* (2013.01)

(58) Field of Classification Search
CPC .......... H04N 21/6581; H04N 21/8586; H04W 12/08; H04W 84/10
USPC .......................................................... 709/219
See application file for complete search history.

(56) References Cited

U.S. PATENT DOCUMENTS

| | | | |
|---|---|---|---|
| 2005/0184993 A1 | 8/2005 | Ludwin et al. | |
| 2005/0207577 A1 | 9/2005 | England et al. | |
| 2005/0216549 A1 | 9/2005 | Amano et al. | |
| 2006/0002315 A1* | 1/2006 | Theurer | G06F 3/0481 370/261 |
| 2006/0010392 A1* | 1/2006 | Noel | G06F 3/0481 715/759 |
| 2006/0206933 A1* | 9/2006 | Molen | H04L 63/0428 726/14 |
| 2006/0291212 A1 | 12/2006 | Forsman et al. | |
| 2009/0207232 A1 | 8/2009 | Mizuno et al. | |
| 2009/0252323 A1 | 10/2009 | Cooper | |
| 2009/0265185 A1* | 10/2009 | Finn | G06F 19/322 705/3 |
| 2009/0293055 A1 | 11/2009 | Carroll et al. | |
| 2013/0247173 A1 | 9/2013 | Jakobsson et al. | |
| 2014/0090003 A1 | 3/2014 | Eguchi et al. | |

OTHER PUBLICATIONS

"Cisco WebEx Meeting Center at-a-Glance," Cisco, http://www.webex.com/, Available as Early as Apr. 1999, 2 pages.
"Skype," Wikipedia, http://en.wikipedia.org/wiki/Skype, Available as Early as Mar. 2004, 19 pages.
"Virtual Network Computing: VNC—How it Works," AT&T Laboratories, http://www.hep.phy.cam.ac.uk/vnc_docs/howitworks.html, Available as Early as Apr. 2005, 3 pages.
"Software Access Point," ArchWiki, https://wiki.archlinux.org/indes.php/Software_Access_Point, Available as Early as Aug. 2006, 4 pages.
"Wi-Fi Direct," Wikipdeia, http://en.wikipedia.org/wiki/Wi-Fi_Direct, Available as Early as Jan. 2010, 5 pages.
"How it Works," GoToMeeting, http://www.gotomeeting.com/fec/online_meeting, Available as Early as Feb. 2010, 3 pages.
"Join.me—Free Screen Sharing and Online Meetings," LogMeIn, Inc., https://join.me/, Available as Early as Oct. 2010, 1 page.
Richardson, T., "The RFB Protocol v3.8," Technical Document, RealVNC Ltd., Nov. 2010, 43 pages.
"About Us," Connectify, http://www.connectify.me/about-us/, Available as Early as Sep. 2011, 3 pages.
"MyPublicWiFi—Virtual Access Point," TrueSoftware, http://www.mypublicwifi.com/publicwifi/en/index.html, Available as Early as Jan. 2012, 4 pages.
"Air Sharing," Wikipedia, http://en.wikipedia.org/wiki/Air_Sharing, Available as Early as May 2012, 1 page.
"Connectify Hotspot," Connectify, http://www.connectify.me/hotspot/, Available as Early as Nov. 2012, 4 pages.
"SharePoint Overview," SharePoint, http://office.microsoft.com/en-us/sharepoint/sharepoint-2013-overview-collaboration-software-features-FX103789323.aspx, Available as Early as Apr. 2013, 2 pages.
ISA Korean Patent Office, International Search Report and Written Opinion Issued in Application No. PCT/US2013/046517, Sep. 4, 2013, WIPO, 10 pages.
Nagel, D., "wePresent Ships 64-User Wireless Classroom Presentation Systems," The Journal, http://thejournal.com/articles/2014/02/10/wepresent-ships-64-user-wireless-classroom-presentation-systems.aspx, Available as Early as Feb. 10, 2014, 5 pages.
"wePresent 1000—Wireless Interactive Presentation Gateway," wePresent WIPG Website, http://www.wepresent1000.com/index.html, Accessed Mar. 24, 2015, 1 page.
"wePresent 1000—How it Works," wePresent WIPG Website, http://www.wepresent1000.com/howitworks.html, Accessed Mar. 24, 2015, 1 page.
"wePresent 1000—Conference Control," wePresent WIPG Website, http://www.wepresent1000.com/conferencecontrol.html, Accessed Mar. 24, 2015, 1 page.
"wePresent 1000—4-to-1 Projection," wePresent WIPG Website, http://www.wepresent1000.com/4-1projection.html, Accessed Mar. 24, 2015, 1 page.
"wePresent 1000—WebSlides," wePresent WIPG Website, http://www.wepresent1000.com/browserslides.html, Accessed Mar. 24, 2015, 1 page.
"wePresent 1500—Annotate On-Screen," wePresent WIPG Website, http://www.wepresent1000.com/1500/annotate1500.html, Accessed Mar. 24, 2015, 1 page.
"wePresent WIPG—Product Comparison," wePresent WIPG Website, http://www.wepresent1000.com/downloads/WePresentWiPG_model_comparison.pdf, Accessed Mar. 24, 2015, 1 page.
"wePresent 2000—Media Streaming," wePresent WIPG Website, http://www.wepresent1000.com/2000/mediastreaming2000.html, Accessed Mar. 24, 2015, 1 page.
"wePresent 2000—1-to-Many Projection," wePresent WIPG Website, http://www.wepresent1000.com/2000/1to4projection2000.html, Accessed Mar. 24, 2015, 1 page.
"wePresent WiFi—wePresent News," wePresent WIPG Website, http://www.wepresentwifi.com/news.html, Accessed Mar. 24, 2015, 5 pages.

* cited by examiner

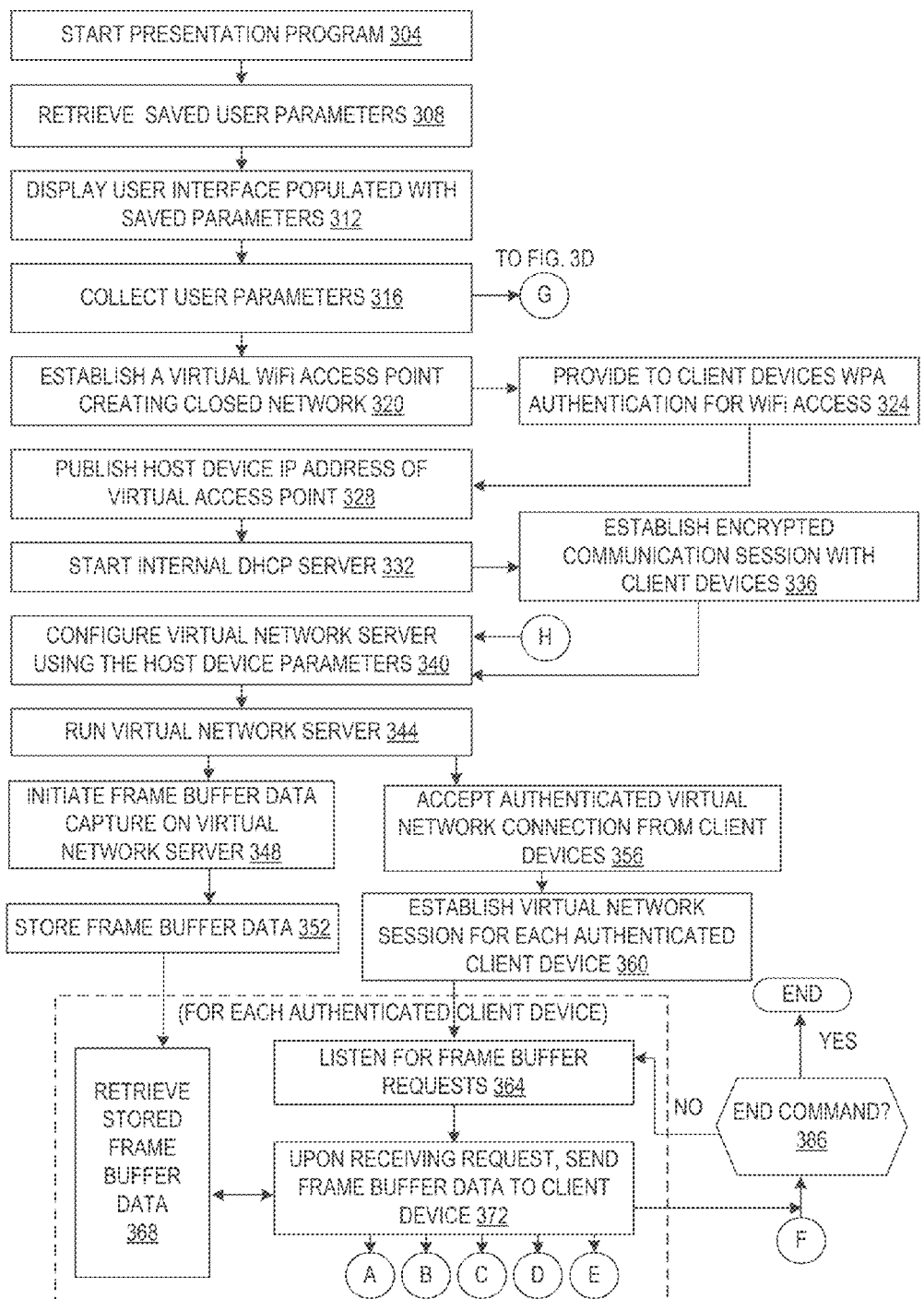

FIG. 3B
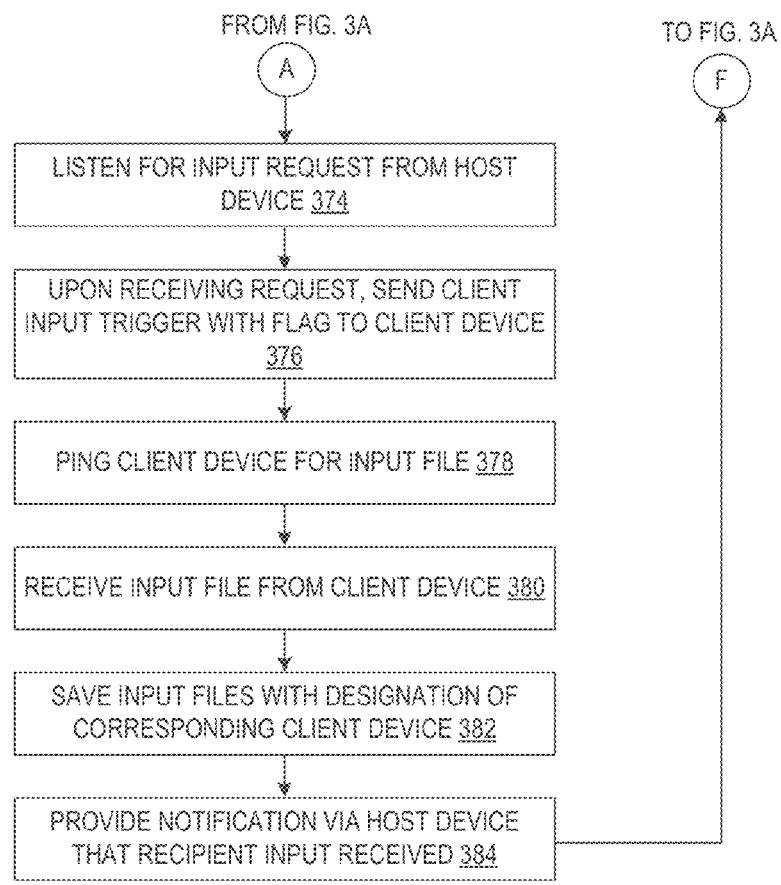
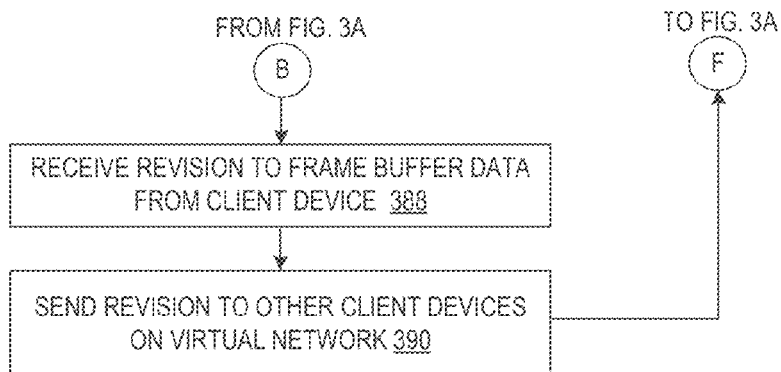

FIG. 3C
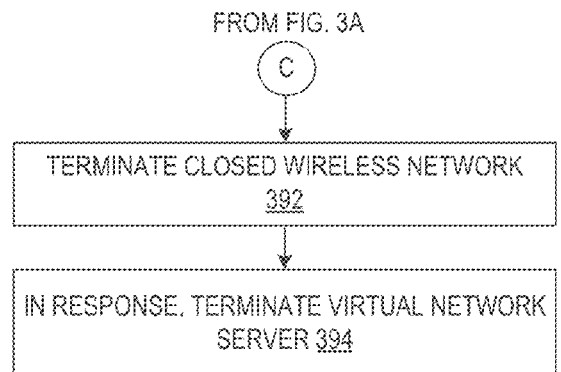
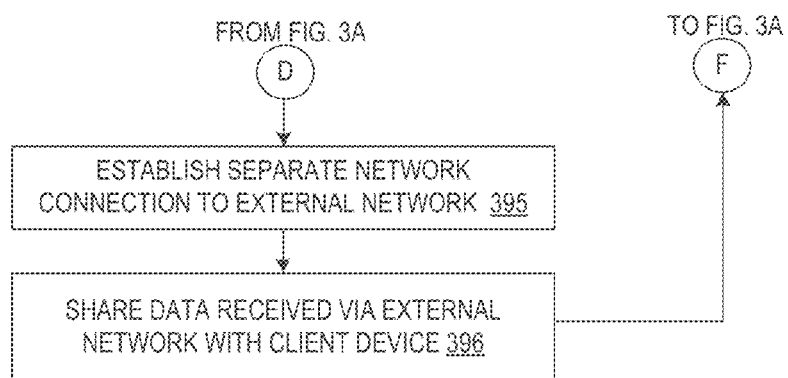
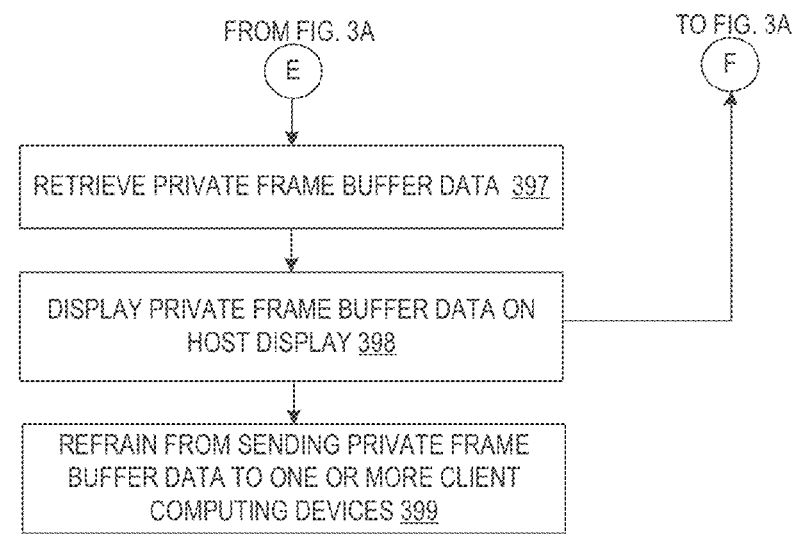

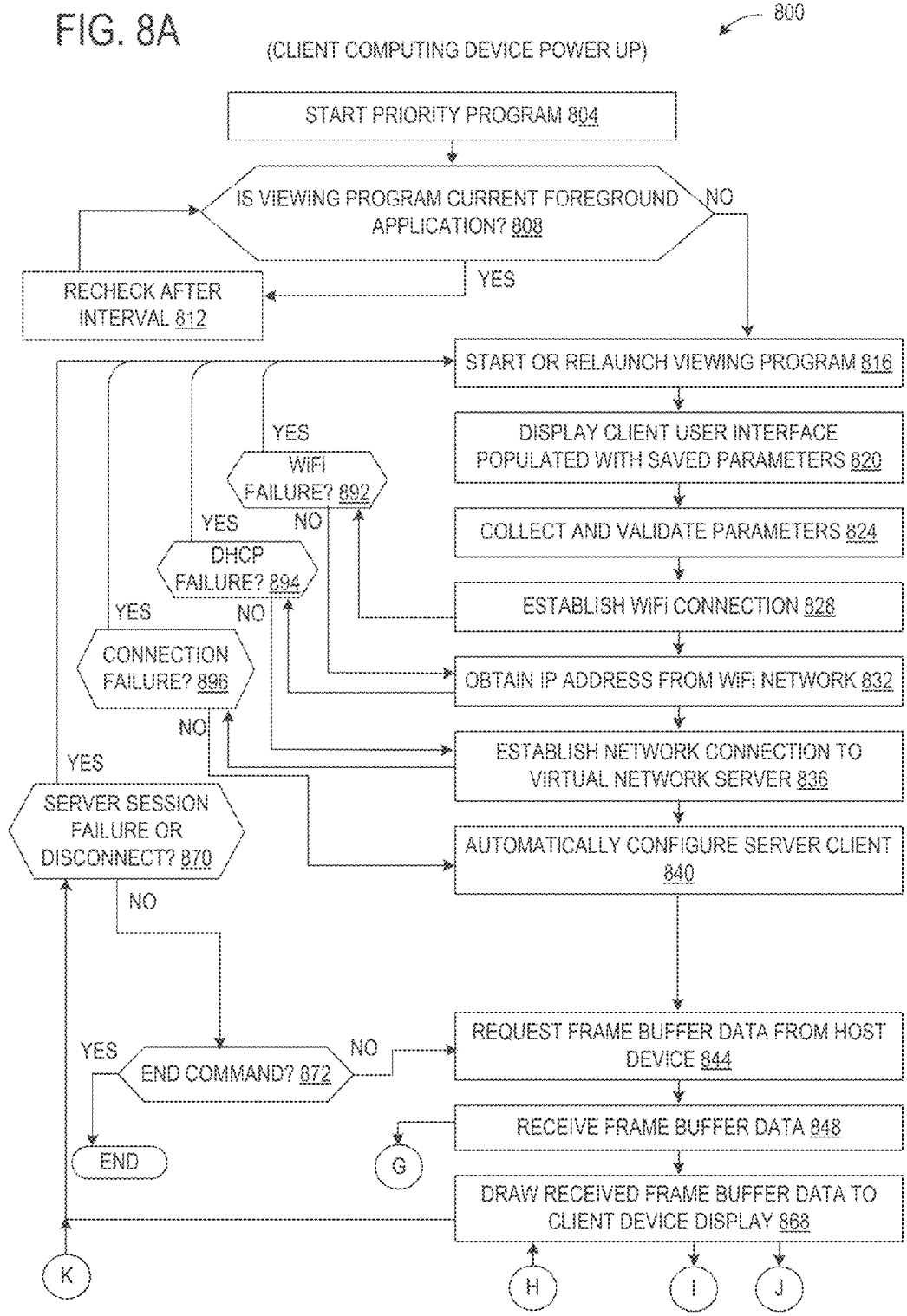

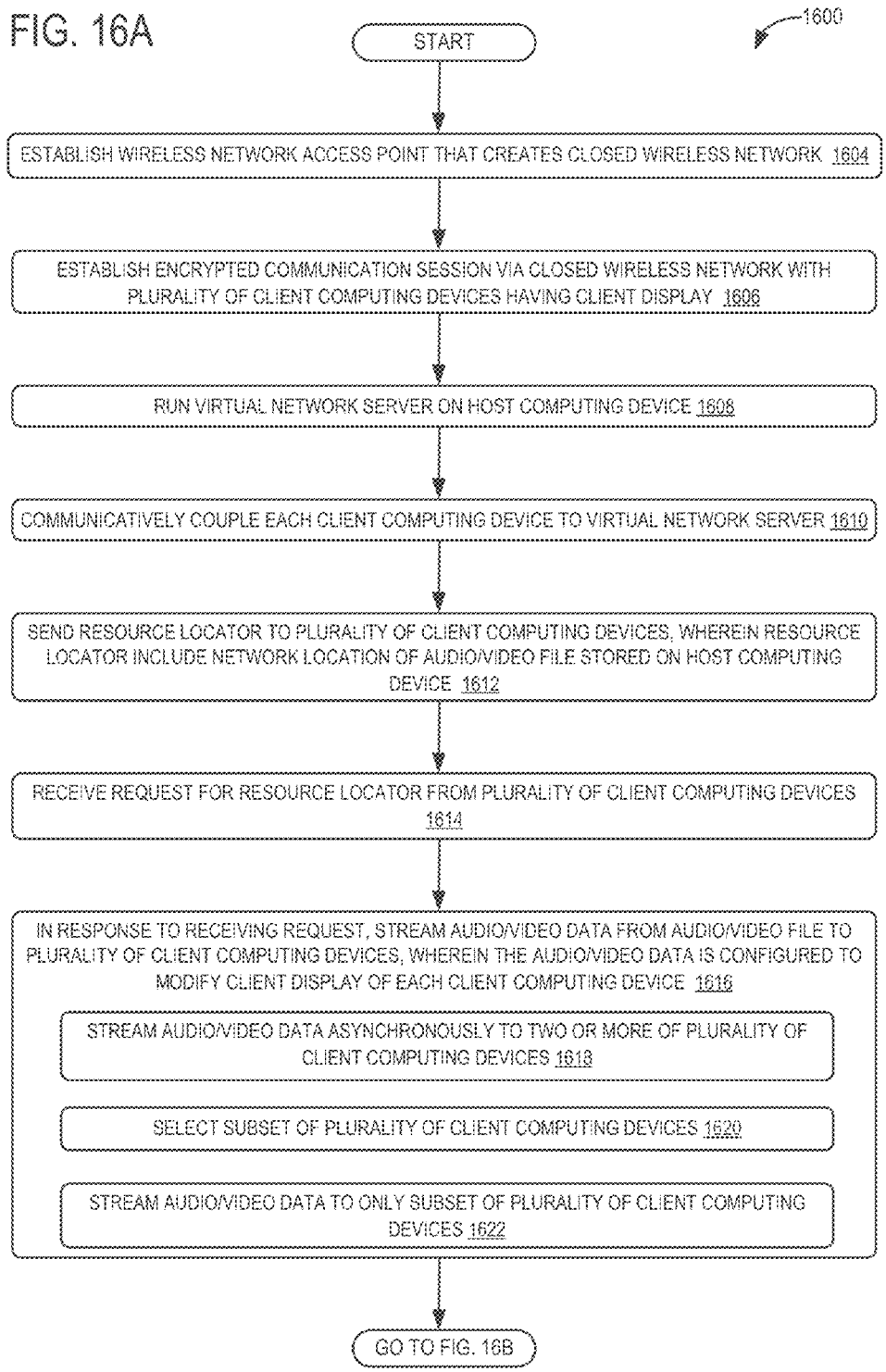

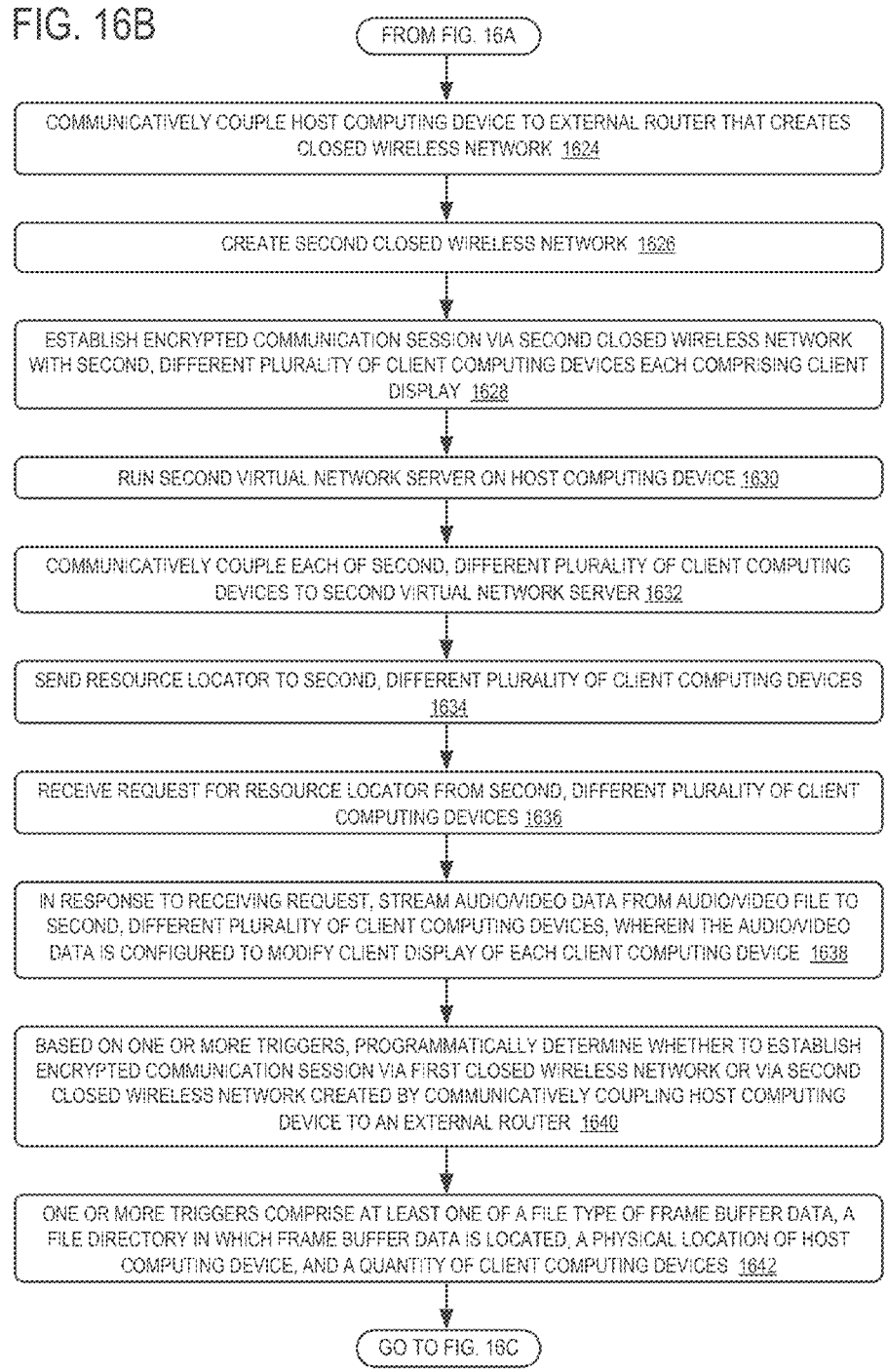

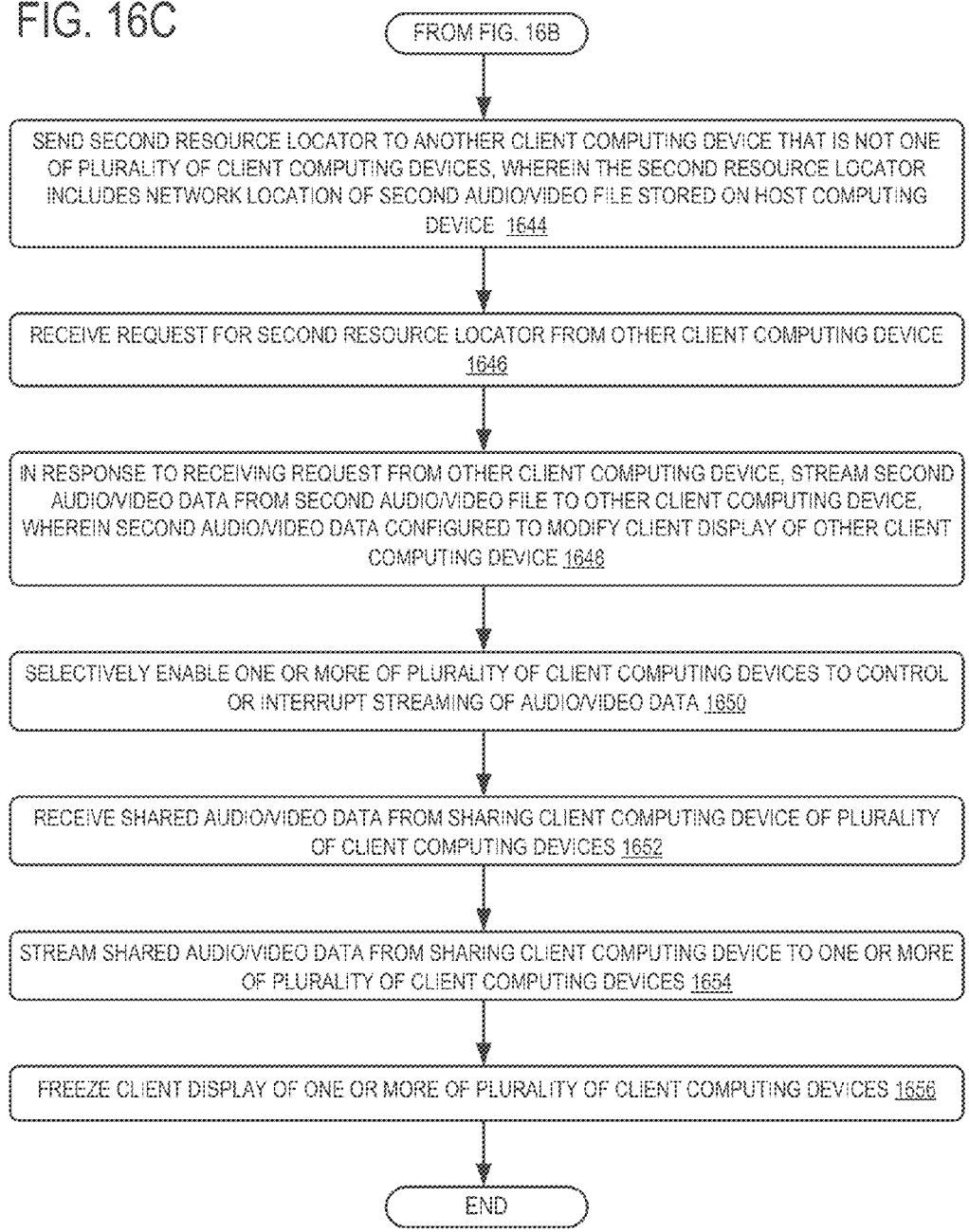

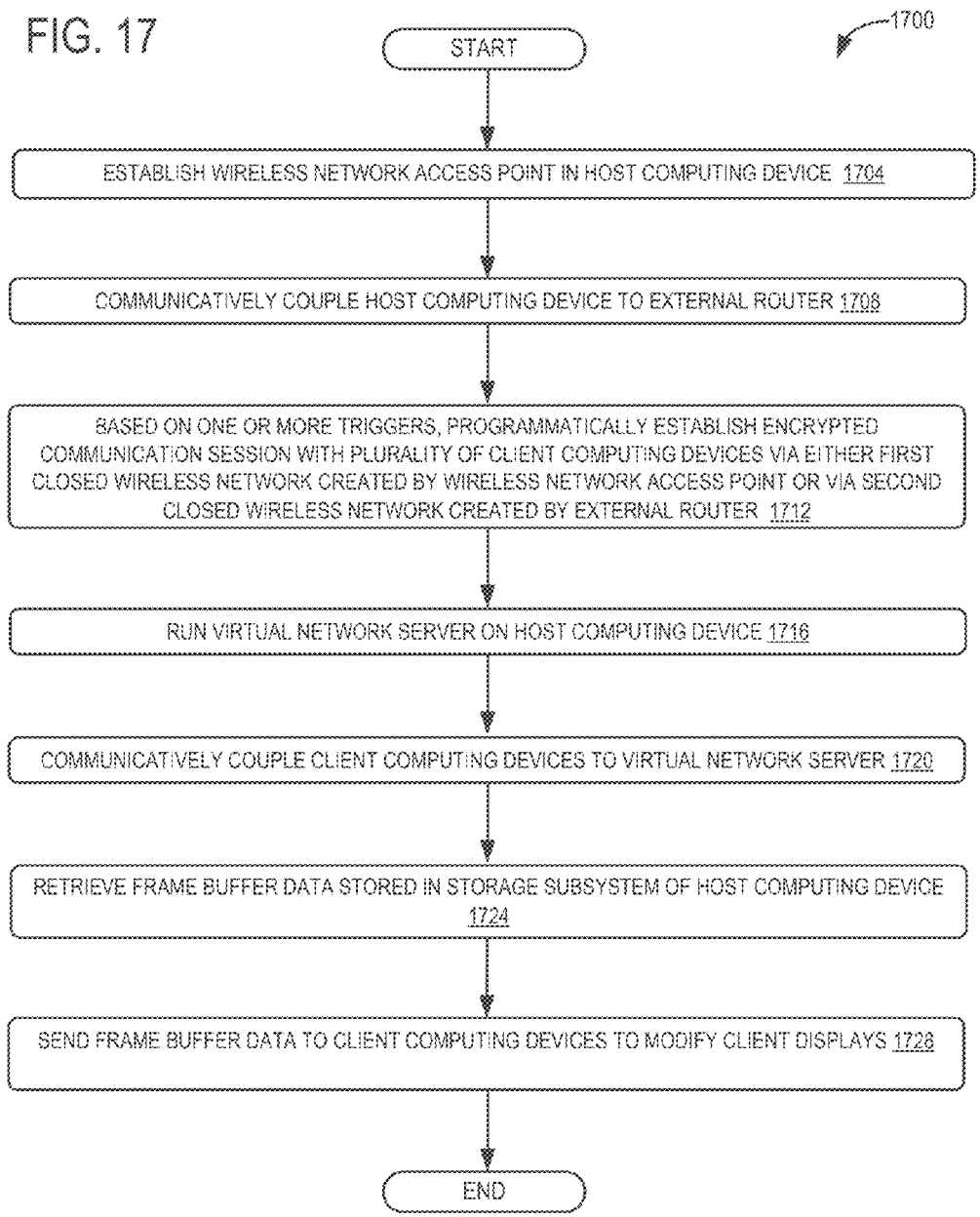

CLOSED NETWORK VIDEO PRESENTATION

CROSS REFERENCE TO RELATED APPLICATIONS

The present application is a continuation-in-part of U.S. patent application Ser. No. 13/921,511, filed on Jun. 19, 2013, now pending, which claims the benefit of U.S. Provisional Patent Application Ser. No. 61/661,733, filed Jun. 19, 2012 and entitled "TABLET PRESENTATION SYSTEM", the entirety of which are hereby incorporated by reference for all purposes. The present application also claims the benefit of U.S. Provisional Patent Application Ser. No. 61/907,936, filed Nov. 22, 2013 and entitled "CLOSED NETWORK VIDEO PRESENTATION," and U.S. Provisional Patent Application Ser. No. 62/013,093, filed Jun. 17, 2014 and entitled "CLOSED NETWORK PRESENTATION," the entirety of which are hereby incorporated by reference for all purposes.

BACKGROUND

Giving presentations is a common and often important aspect of many professions and business ventures. As with any form of communication, the most effective presentations to an audience will sustain the audience's attention, enable easy viewing of the presenter's materials, and facilitate audience focus on the presentation. In some cases, the presenter may be making a presentation in a third party location, such as a client's conference room, a meeting facility or other location potentially unfamiliar to the presenter.

Various forms of computing technology are often utilized in making presentations. When the audience is smaller, a presenter may use a single portable device such as a tablet or laptop computer to display a presentation. However, this form of presentation requires the audience to crowd around the device display, perhaps in uncomfortable or awkward positions. The small presentation space also may result in awkward interactions and constrained movements when referencing points on the display.

In another example, fixed or portable projectors may display a presentation on a wall or separate screen. However, the room in which a projector is utilized should have certain features and configurations for projected presentations to be effective. For example, the room should have a wall suitable for displaying the projected images, as well as appropriate seating for easy viewing of the presentation. If a suitable wall is not available, a separate screen must be provided by the presenter or facility personnel, and the screen must be carefully located for easy viewing by the audience. In practice, many conference rooms and other locations are unsuitable for projection presentations. Additionally, privacy concerns may also make projected presentations undesirable.

Further, the presenter often must allow extra time before beginning the presentation for setting up and configuring the projector. The presenter may also be relying on the meeting host or other party to set up and configure the projector, which may or may not occur. Further, and particularly when a presenter is using a projector provided by the meeting host or other party, equipment connectivity issues, projector component failure and other technical issues may occur and negatively impact the presentation.

Where each audience member has a computing device that is connected to the Internet or other existing network, an online application such as a web conference application or peer-to-peer application may be used to provide the presentation. However, presentations delivered via the Internet or other existing network connections may be subject to distracting latency issues where connection speed is limited or fluctuates. Among other examples, such issues may degrade the quality of a streamed video, making video portions of a presentation unacceptably poor. Presentations may also be interrupted entirely should the network connection fail. Further, existing solutions for directly streaming video provide limited control and monitoring of a recipient's viewing of the video.

In some situations, audience members' computing devices may operate on different platforms and/or utilize differing networking configurations and corresponding networking hardware. Such differing software and hardware can present connectivity challenges and associated latency issues related to changing connection speeds.

Additionally, and especially where a presentation contains sensitive or confidential information, security concerns with such data traveling over the Internet or other third party networks may also be significant. Further, if the location of the presentation does not provide access to a required external network, or the presenter is unable to connect to a local network, such online applications may not be used.

BRIEF DESCRIPTION OF THE DRAWINGS

FIGS. 3A, 3B, 3C, 3D, 3E and 3F are a flow chart of a method for delivering a presentation via a closed wireless network according to an example of the present disclosure.

FIGS. 8A and 8B are a flow chart of a method for viewing a presentation via a closed wireless network according to an example of the present disclosure.

FIGS. 16A, 16B and 16C are a flow chart of a method for delivering a presentation via a closed wireless network according to an example of the present disclosure.

FIG. 17 is a flow chart of a method 1700 for delivering a presentation via a closed wireless network using an external router.

DETAILED DESCRIPTION

Figure 1:
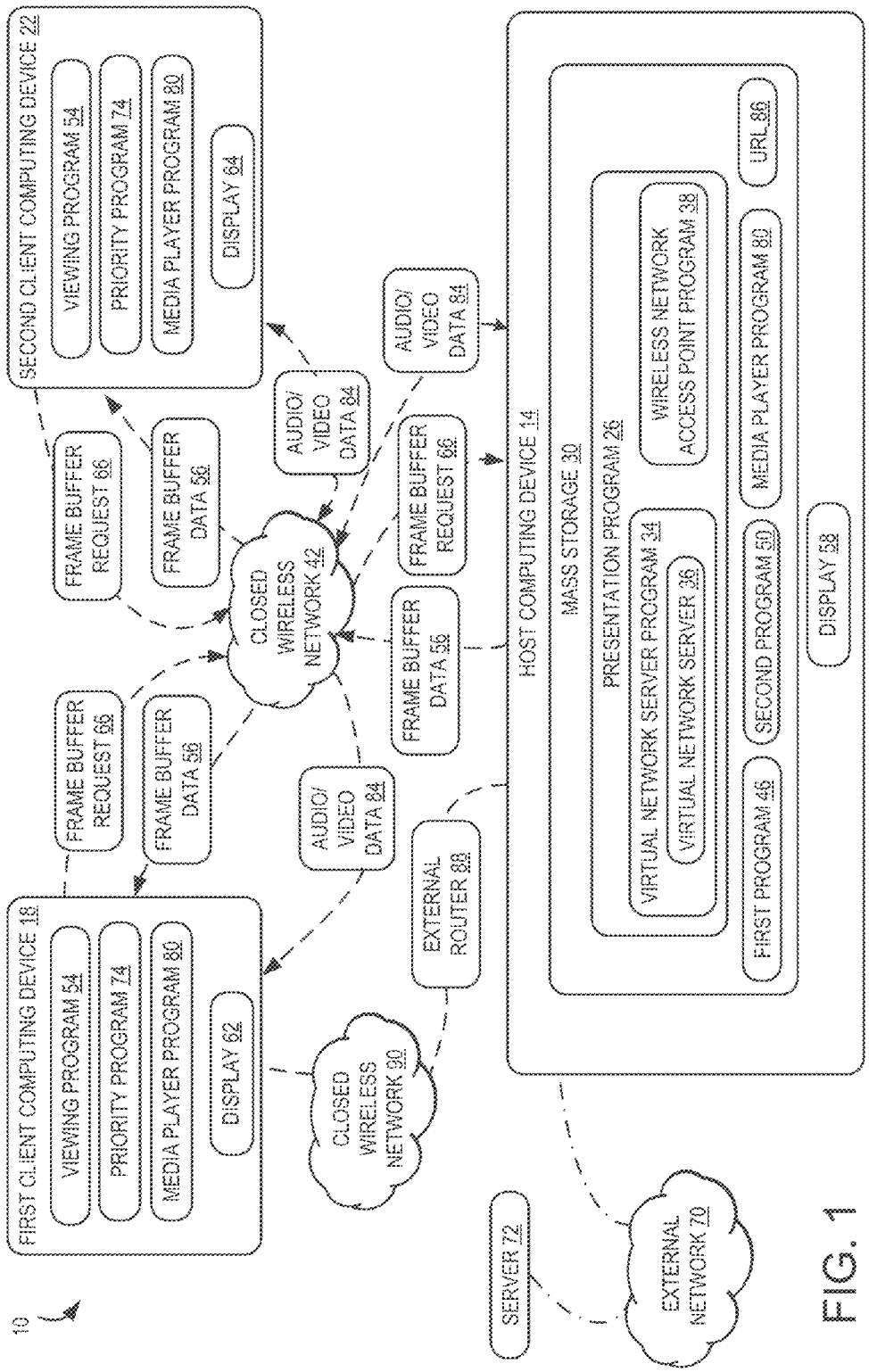
FIG. 1 is a schematic view of a presentation system according to an example of the present disclosure.

FIG. 1 shows a schematic view of one example of a presentation system 10 according to an example of the present disclosure. The presentation system 10 includes a host computing device 14, a first client computing device 18 and a second client computing device 22. It will be appreciated that in other examples, the presentation system 10 may include 1, 3, 4, 5, 10 or other suitable number of client computing devices.

The host computing device 14 includes a presentation program 26 that may be stored in mass storage 30 of the host computing device. The presentation program 26 may be loaded into memory and executed by a processor of the host computing device 14 to perform one or more of the methods and processes described in more detail below. The presentation program 26 may comprise a virtual network server program 34 that may be executed to run a virtual network server 36 on the host computing device 14.

The presentation program 26 may also comprise a wireless network access point program 38 that may be executed to establish a wireless network access point that creates a closed wireless network 42. A closed wireless network is a wireless network that is not communicatively coupled to another wired or wireless network. In some examples, a host computing device 14 may establish a closed wireless network 42 while also connecting or being connected to one or more other networks, such as the Internet. In these examples, the closed wireless network is not communicatively coupled to the one or more other networks. As described in more detail below, the presentation program 26 may create and utilize the closed wireless network 42 to establish an encrypted communication session with the first client computing device 18 and the second client computing device 22.

In some examples and as described in more detail below, the presentation system 10 may comprise an external router 88 that may be utilized to create a closed wireless network 90 and encrypted communication session in addition to or instead of the closed wireless network 42 established by the wireless network access point program 38 of the host computing device 14. The first client computing device 18, second client computing device 22, and/or additional client computing devices may be communicatively coupled to the closed wireless network 90 via the external router 88.

The host computing device 14 may also include one or more other programs stored in mass storage 30. In the example shown in FIG. 1, the host computing device 14 includes a first program 46 and a second program 50. In one example, the first program 46 may be a program such as Microsoft PowerPoint or Apple Keynote, and the second program 50 may be a word processing program such as Microsoft Word. Examples of other programs that may be stored in mass storage 30 include, but are not limited to, viewer applications, spreadsheet applications, photo management programs, web browsers, etc.

The first client computing device 18 and second client computing device 22 include a viewing program 54 that may interface with the presentation program 26 on the host computing device 14 via the closed wireless network 42 or closed wireless network 90. As described in more detail below, the viewing program 54 may be executed by a processor of the corresponding client computing device, and may be configured to receive and display frame buffer data 56 from the host computing device 14.

The host computing device 14, first client computing device 18 and second client computing device 22 may each include a media player program 80 that may be utilized to play back multimedia files. In some examples the media player program 80 may play audio/video data 84 in the form of a movie, video clip, slideshow, audio file, or other type of audio/video data. In different examples the audio/video data 84 may comprise audio only data, video only data, or audio and video data. Any suitable media player program that may transcode video and audio from one format to another may be utilized. Examples of media player programs include, but are not limited to, the QuickTime Player and the Windows Media Player.

The host computing device 14, first client computing device 18, and second client computing device 22 may operate utilizing any suitable operating system. Examples of such operating systems include, but are not limited to, Microsoft Windows, Apple OS X, Linux, Android, Windows Phone, and iOS.

The host computing device 14 may take the form of a desktop computing device, a mobile computing device such as a tablet computer, laptop, notebook, smart phone, or other suitable type of computing device. The first client computing device 18 and second client computing device 22 may take the form of a mobile computing device such as a tablet computer, laptop, notebook, smart phone, or other suitable type of computing device. The host computing device 14 includes a host display 58, the first client computing device 18 includes a client display 62, and the second client computing device 22 includes a client display 64.

Additional details regarding the components and computing aspects of the host computing device 14, first client computing device 18 and second client computing device 22 are described in more detail below with reference to FIG. 18.

Advantageously, and as described in more detail below, the presentation program 26 may create and utilize a closed wireless network to establish an encrypted communication session with the first client computing device 18 and the second client computing device 22. By running a virtual network server 36 and communicatively coupling the first client computing device 18 and second client computing device 22 to the server, the presentation program 26 may conveniently and securely deliver a presentation to one or more client computing devices. Further, the presentation program 26 may deliver the presentation without access to the Internet or other external network. A presentation is defined as output generated and/or displayed by one or more applications and/or by one or more programs. For example, a Keynote presentation may comprise images generated and displayed via a Keynote application. Another presentation may comprise a video, audio, or audio and video streamed from the host computing device 14 to one or more client computing devices.

Figure 2:
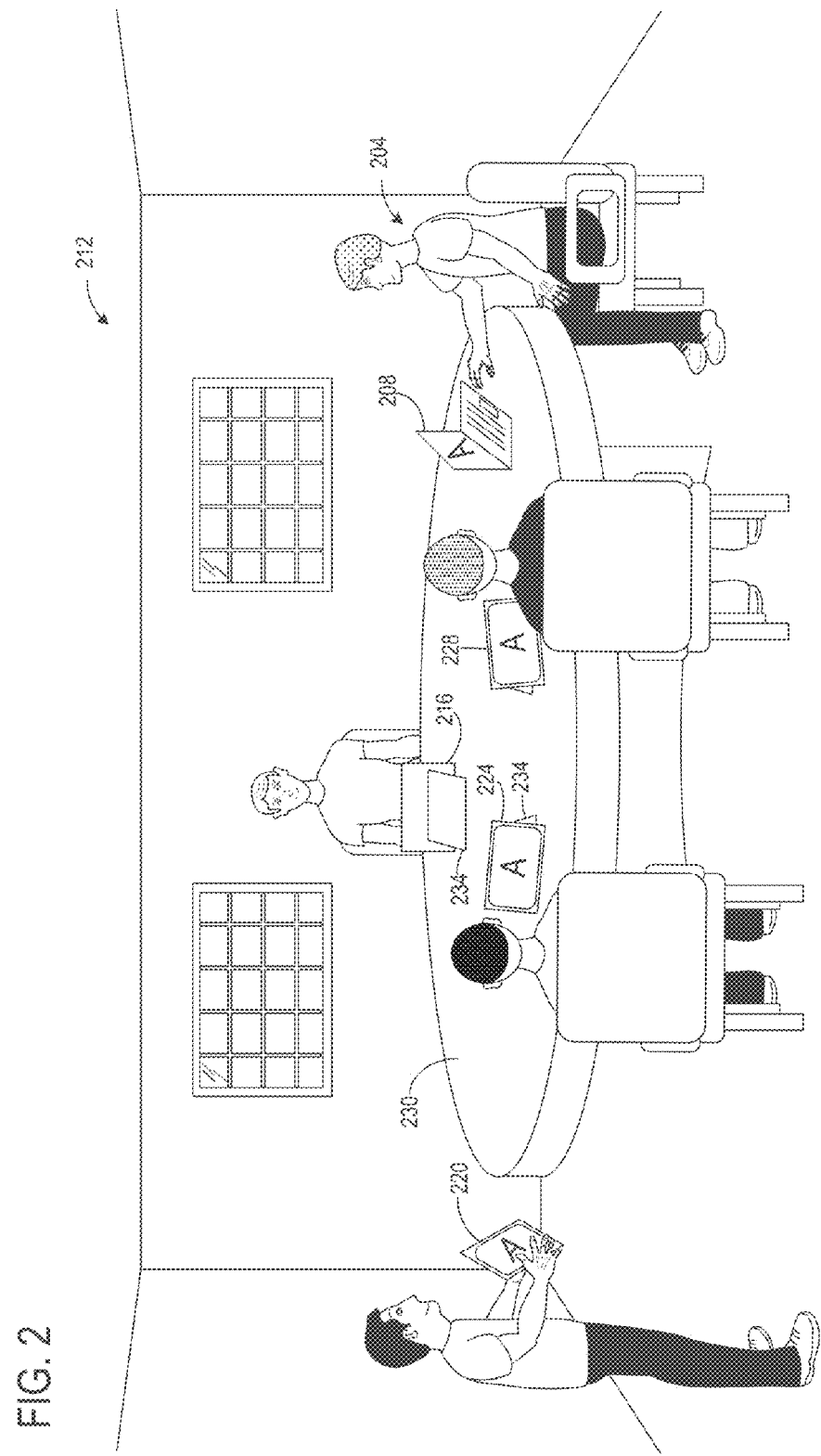
FIG. 2 is a schematic perspective view of a room including a presenter using a host computing device and four recipients using client computing devices according to an example of the present disclosure.

Turning now to FIG. 2, in one example use case a sales professional presenter 204 may have a meeting with prospective customers (also referred to as recipients) in the customers' conference room 212. The presenter 204 may have an electronic presentation describing his company's new product to present to the customers. The presenter 204 may bring a host computing device 14 in the form of a laptop computer 208 that includes the presentation program 26. The presenter may also bring 4 client computing devices 216, 220, 224, and 228 in the form of tablet computers that are provided to each of the prospective customers. Each of the client computing devices 216, 220, 224, and 228 may be preloaded with the viewing program 54. In another example, one or more of the customers may bring a client computing device to the meeting and may transfer or download the viewing program 54 to their device prior to the presentation.

As described in more detail below, the presenter 204 may start the presentation program 26 with a single selection in a presentation user interface. Similarly, each prospective customer may power up his tablet, which may programmatically launch the viewing program 54. The presentation program 26 on the laptop may then programmatically establish a virtual WiFi access point to create a closed wireless network 42 to which each of the tablets are automatically connected. An encrypted communication session is established between the laptop 208 and the tablets.

The presentation program 26 also programmatically runs a virtual network server 36 via the laptop 208 to which each of the tablets is communicatively coupled. Frame buffer data 56 from the presenter's electronic presentation is captured on the laptop 208 and shared with each of the tablets, which utilize the viewing program 54 to draw the frame buffer data to the client display of each client computing device.

Advantageously and as described in more detail below, the presentation system 10 thereby enables the presenter 204 to create a secure, closed wireless network on the fly, and to deliver the presentation via the network to the client computing devices. The presenter 204 may maintain full control of the application that is generating the presentation content being shared, and in this manner may manage the user experience of each of the prospective customers by controlling the output generated by the client display of each client computing device.

In some examples, the viewing program 54 on each client computing device may prevent any revision to the frame buffer data comprising the presentation content that is displayed on the client computing device. Advantageously, in this manner the presenter 204 may be assured that each prospective customer is viewing the same presentation content that is displayed on the host computing device 14. Further and as noted above, the presentation system 10 may operate without any connection to or reliance on the Internet or other external network.

Additionally, the prospective customers are free to enjoy the presentation in a variety of positions or orientations. For example, a prospective customer may sit and view the presentation via their client computing device, which may be supported on table 230 by a stand 234. A prospective customer may also stand, walk, stretch, etc., while holding a client computing device and maintaining focus on the material being presented. Additional potential benefits of the presentation system 10 of the present disclosure are discussed below.

It will be appreciated that a range of the closed wireless network 42 created by the presentation program 26 may be related to the range of the wireless network standard utilized. In one example, a closed wireless network 42 based on the IEEE 802.11 standards (WiFi) may have a range of approximately 20-30 meters.

FIGS. 3A, 3B, 3C, 3D, 3E and 3F illustrate a flow chart of a method 300 for delivering a presentation via a closed wireless network. The following description of method 300 is provided with reference to the software and hardware components of the presentation system 10 described and shown herein. The following description is also provided from a perspective of the host computing device 14. It will be appreciated that method 300 may also be performed in other contexts using other suitable hardware and software components.

With reference to FIG. 3A, at 304 the method 300 may include starting the presentation program 26 on a host computing device 14. In one example, the presentation program 26 may be launched when a presenter selects a corresponding icon on a desktop of the host computing device 14. With reference also to FIG. 4, upon launch the presentation program 26 may display a user interface 404 on the host display 58 of the host computing device 14. At 308 the method 300 may include retrieving saved user parameters from a storage subsystem of the host computing device 14. In one example, the user parameters may include network credentials such as a network name 408 and a password 412 (see FIG. 4). At 312 the method 300 may include displaying the saved parameters populated in the user interface 404. In another example where saved user parameters are not available, at 316 the method 300 may include collecting user parameters via user input to the host computing device.

Figure 3D:
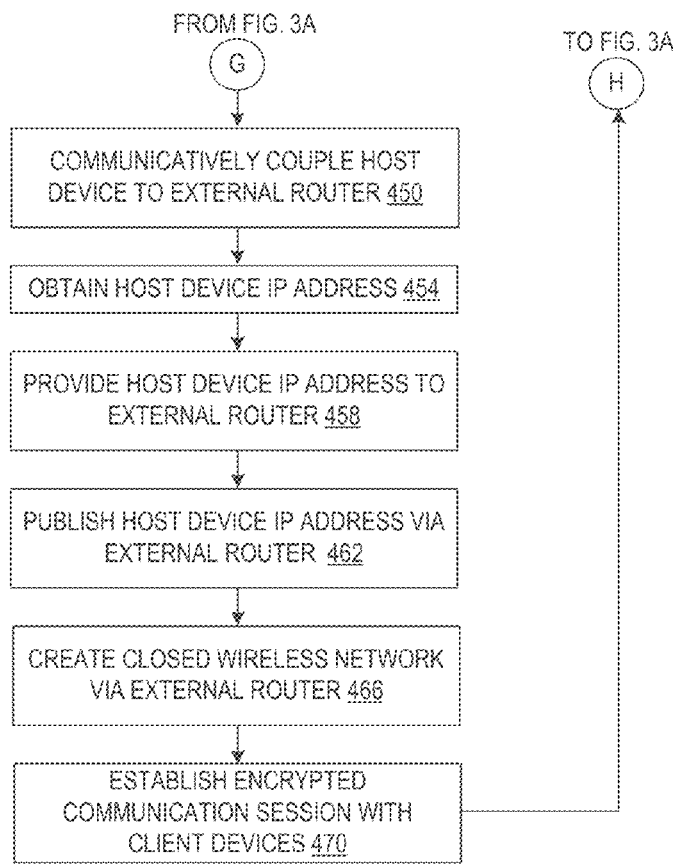
Figure 4:
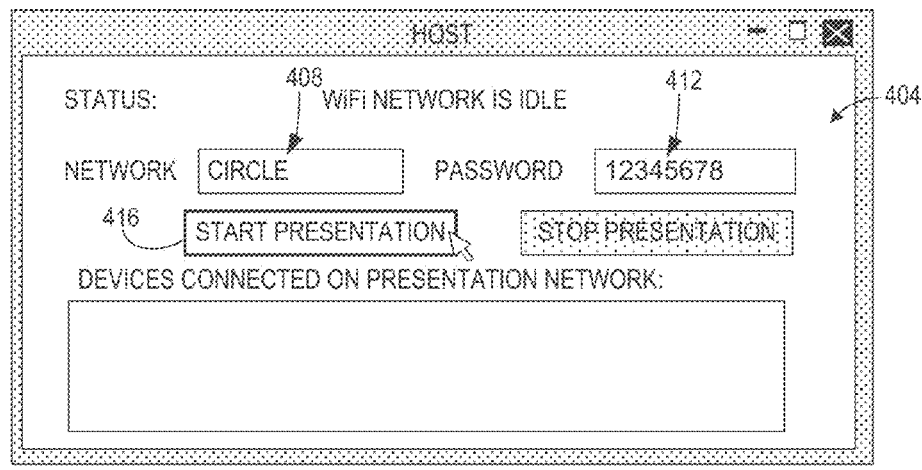
FIG. 4 is a schematic illustration of a user interface displayed on a host computing device according to an example of the present disclosure.

Turning now to FIG. 3D, in some examples at 450 the method 300 may include communicatively coupling the host computing device 14 to an external router 88 that creates a closed wireless network 90. At 454 the method 300 may include obtaining the IP address of the host computing device 14. At 458 the method 300 may include providing the host IP address to the external router 88. At 462 the method 300 may include publishing the IP address of the host computing device 14 to client computing devices via the external router 88.

At 466 the method 300 may include creating a closed wireless network 90 via the external router 88. At 470 the method 300 may include establishing an encrypted communication session via the closed wireless network 90 with one or more client computing devices, such as first client computing device 18 and second client computing device 22. In some examples, an external router 88 may be utilized to create the closed wireless network 90 and encrypted communication session in addition to or instead of the closed wireless network 42 established by the wireless network access point program 38 of the host computing device 14. With an encrypted communication session established, the method 300 may proceed with step 340 of FIG. 3A that is described in more detail below.

Returning to FIG. 3A and in another example, at 320 the method 300 may include establishing a virtual WiFi access point, or software enabled access point, that creates a closed wireless network 42. It will be appreciated that any suitable virtual WiFi access point technology may be utilized. Examples may include, but are not limited to, Microsoft Windows SoftAP wireless access point software and hostapd software for Linux and FreeBSD platforms.

At 324 the method 300 may include providing to client computing devices Wi-Fi Protected Access (WPA) authentication for creating an encrypted communication session with the host computing device. It will be appreciated that any other suitable security protocol or encryption algorithm may also be utilized.

At 328 the method 300 may include publishing a host device IP address of the virtual access point to the client computing devices. At 332 the method 300 may include starting an internal DHCP server on the host computing device 14. The DHCP server may provide dynamic IP addressing for assigning IP addresses to the client computing devices. At 336 the method 300 may include establishing an encrypted communication session with the client computing devices utilizing WPA protocols.

At 340 the method 300 may include configuring a virtual network server 36 using the host device parameters. In one example, a virtual network server based on Virtual Network Computing protocols may be configured. It will be appreciated that any other suitable virtual network server technology that operatively connects the virtual server to a viewing program 54 on a client computing device may also be utilized. At 344 the method 300 may include running the virtual network server 36 on the host computing device 14. At 348 the method 300 may include initiating on the virtual network server 36 a frame buffer data capture task in which frame buffer data 56 from the host computing device is captured at periodic intervals. In some examples, the rate at which frame buffer data 56 or host display screen shots are captured may be 2 frames per second (fps), 10 fps, 30 fps or any other suitable frequency. At 352 the method 300 may include storing the captured frame buffer data 56 in a storage subsystem of the host computing device 14.

It will be appreciated that frame buffer data 56 may comprise screen shots of content displayed on the host display 58 of the host computing device 14. As described in more detail below, sharing such content with one or more client computing devices enables a presenter to effectively deliver a presentation to such devices and corresponding recipients viewing the devices.

At 356 the method 300 may include accepting authenticated virtual network connections from one or more client computing devices. In this manner, the one or more client computing devices may be communicatively coupled to the virtual network server 36. At 360 the method 300 may include establishing a virtual network session for each authenticated client computing device.

At 364 the method 300 may include listening for frame buffer requests 66 from each authenticated client computing device. At 368 the method 300 may include retrieving stored frame buffer data 56 from a storage subsystem of the host computing device, such as a screen buffer. At 372 the method 300 may include, upon receiving a frame buffer request from a client computing device, sending frame buffer data 56 to the device. Advantageously, in this manner the method 300 may deliver a presentation from a host computing device 14 to one or more client computing devices.

Turning now to FIG. 3B, in some examples at 374 the method 300 may include listening for an input request that may be received via the host computing device 14. Examples of input requests include, but are not limited to, surveys for receiving feedback from users of client computing devices, requests for signatures from users of client computing devices, and requests for votes from users of client computing devices with regard to proposals, questions, etc. It will be appreciated that many other forms of input requests may also be utilized and are within the scope of the present disclosure.

In one example and with reference again to FIG. 2, the presenter 204 may desire to send an electronic survey to the four prospective customers via their client computing devices 216, 220, 224 and 228 to collect feedback regarding the presenter's presentation. The presenter 204 may request the survey from the laptop 208 host computing device by, for example, selecting a survey option from an options menu on a user interface generated by the presentation program 26.

With reference again to FIG. 3B, at 376 the method 300 may, upon receiving the input request from the host computing device 14, send a client input trigger comprising survey data and a flag to each of the client computing devices 216, 220, 224 and 228. At 378 the method 300 may include pinging each client computing device 216, 220, 224 and 228 for an input file that is responsive to the survey. At 380 the method 300 may include receiving an input file corresponding to the client input trigger from one or more of the client computing devices 216, 220, 224 and 228.

At 382 the method 300 may include saving the input file along with a designation of the corresponding client computing device that provided the input file. In this manner, the presentation program 26 may associate the data responsive to the survey in the input file with the client computing device and corresponding prospective customer, and may subsequently access such data as desired. At 384 the method 300 may include providing notification to the presenter via the host computing device 14 that input has been received. Such notification may take the form of, for example, a pop up message, audible alert, flashing icon, or any other suitable notification.

Returning to FIG. 3A, at 386 the method 300 may include determining whether a command to end the presentation has been received from the host computing device 14. If an end command has been received, then the presentation program 26 may terminate the virtual network session with each of the client computing devices. If an end command has not been received, then at 364 the method 300 may continue to listen for frame buffer requests.

Returning now to FIG. 3B, in some examples at 388 the method 300 may include receiving a revision to frame buffer data 56 from a client computing device. Revisions to frame buffer data 56 may include, but are not limited to, modifications to images and/or text received in frame buffer data such as, for example, highlighting images and/or text or portions of images and/or text, selecting images and/or text or portions of images and/or text by, for example, marking, circling or otherwise visually indicating images and/or text or portions of images and/or text, enlarging, shrinking or otherwise modifying images and/or text or portions of images and/or text, adding images and/or text or other predefined content etc.

Figure 5:
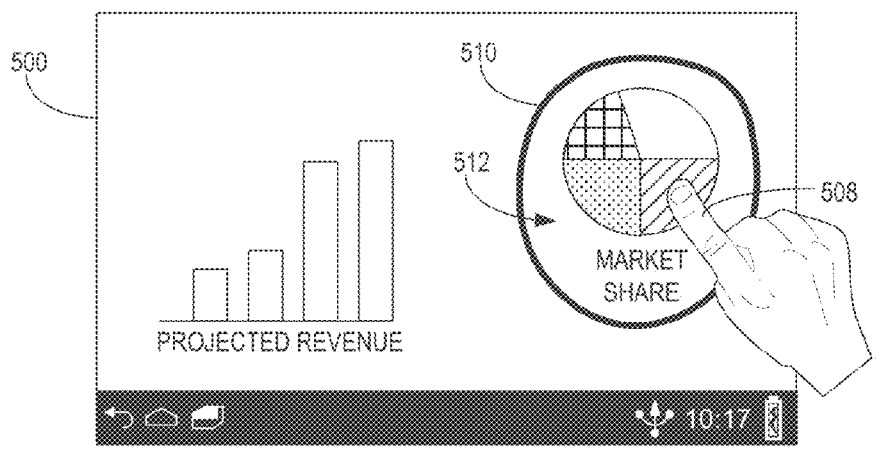
FIG. 5 is a schematic illustration of a portion of a presentation displayed on a client computing device according to an example of the present disclosure.

With reference now to FIG. 5, one example of a revision to frame buffer data 56 is provided. FIG. 5 shows a schematic illustration of one example of a client touchscreen display 500 of a client computing device that is displaying frame buffer data 56 received from a host computing device 14. In this example, a revision to frame buffer data 56 is created when a recipient's finger 508 taps an area corresponding to an icon 512 displayed on the surface of the touchscreen display 500 to highlight the icon. In response to the recipient's input, the viewing program 54 of the client computing device causes an encircling ring 510 surrounding an icon 512 to be drawn on the display 500.

Figure 6:
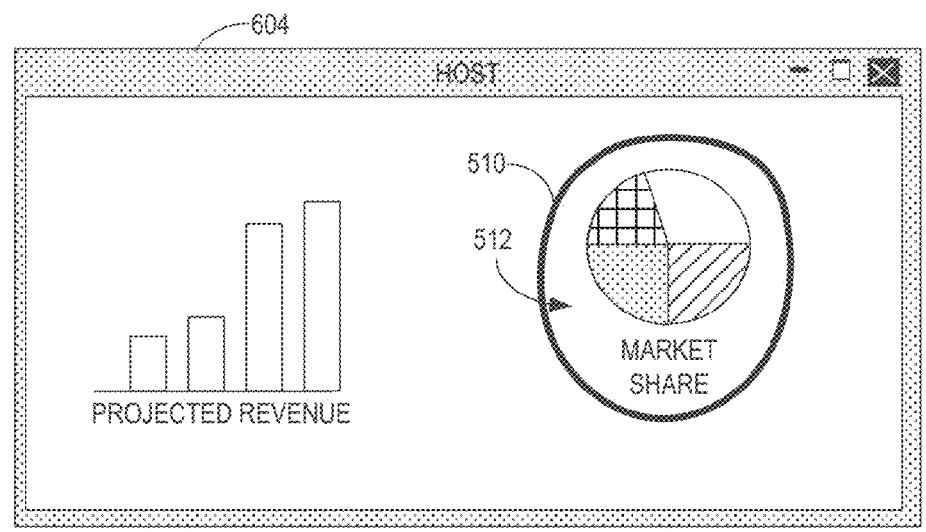
FIG. 6 is a schematic illustration of the portion of the presentation of FIG. 5 displayed on a host computing device according to an example of the present disclosure.

With reference now to FIG. 6, when a host computing device 14 receives the revision to frame buffer data 56 from the client computing device, the presentation program 26 displays the encircling ring 510 surrounding the icon 512 on the host display 604 of the host computing device 14. Advantageously, in this manner the method 300 may enable recipients of a presentation to provide real time feedback to a presenter during a presentation.

Additionally, in some examples and with reference again to FIG. 3B, at 390 the method 300 may include sending the revision to frame buffer data 56 to the other client computing devices participating in the presentation via the virtual network. In this example, each of the recipients may also see in real time the revisions provided by another recipient. Additionally, in some examples revisions to frame buffer data 56 received from client computing devices may be saved to a storage subsystem of the host computing device 14 for future reference by, for example, users of the host computing device.

Returning to FIG. 3A and as noted above, at 386 the method 300 may include determining whether a command to end the presentation has been received from the host computing device 14. If an end command has been received, then the presentation program 26 may terminate the virtual network session with each of the client computing devices. If an end command has not been received, then at 364 the method 300 may continue to listen for frame buffer requests.

With reference now to FIG. 3C, in some examples at 392 the method 300 may include terminating the closed wireless network 42. At 394 and in response to termination of the closed wireless network 42, the method 300 may include terminating the virtual network server 36 to thereby conserve bandwidth, power, and other resources of the host computing device 14.

Continuing with FIG. 3C, at 395 and in some examples the method 300 may include establishing a separate network connection to an external network 70, such as a local area network or the Internet. At 396 the method 300 may include sharing external data received via the external network 70 with client computing devices via the closed wireless network 42. Additionally, in this example the closed wireless network 42 and external network 70 are not communicatively coupled such that no frame buffer data 56 or other data passing via the closed wireless network is available or otherwise exposed to the external network 70. Advantageously, in this example the host computing device 14 may receive external data via the external network 70, such as from a server 72, and may securely share the data with client computing devices via the closed wireless network.

Returning to FIG. 3A and as noted above, at 386 the method 300 may include determining whether a command to end the presentation has been received from the host computing device 14. If an end command has been received, then the presentation program 26 may terminate the virtual network session with each of the client computing devices. If an end command has not been received, then at 364 the method 300 may continue to listen for frame buffer requests.

In some examples, a presenter may desire to privately view or selectively share certain information or data during a presentation. For example, a presenter may wish to consult and display on the host display 58 of the host computing device 14 confidential data or other proprietary or otherwise sensitive information that the presenter does not want to share with one or more of the presentation recipients. In these examples, such data may be referred to as private frame buffer data, while the frame buffer data 86 that is shared with one or more of the client computing devices may be referred to as shared frame buffer data.

Continuing with FIG. 3C, at 397 and in some examples the method 300 may include retrieving private frame buffer data stored in the storage subsystem of the host computing device. At 398 the method 300 may include displaying the private frame buffer data on the host display 58 of the host computing device 14. At 399 the method 300 may include refraining from sending the private frame buffer data to one or more of the client computing devices. For example, the private frame buffer data may not be sent to any of the client computing devices participating in the presentation. In other examples, the presenter may refrain from sending the private frame buffer data to one or more client computing devices, while selecting one or more other client computing devices via the presentation program 26 to receive the private frame buffer data.

In some examples, in addition to refraining from sending the private frame buffer data to one or more of the client computing devices, shared frame buffer data in the form of blocking data may be sent to one or more of the client devices. Such blocking data may, for example, be displayed on a client display of a client computing device as a screen filled with a single color, such as white, black, or other color, a message indicating the presentation is paused, or other suitable message or image.

In other examples, in addition to refraining from sending the private frame buffer data to one or more of the client computing devices, the shared frame buffer data being displayed on the client computing devices may be frozen and continuously displayed while the private frame buffer data is displayed on the host display 58 of the host computing device 14. In other examples, the presentation program 26 may freeze the client display of one or more client computing devices to display a static image of shared frame buffer data, and may not retrieve or display private frame buffer data on the host display 58 of the host computing device 14.

In some examples and as noted above, the host computing device 14 may establish a closed wireless network 42 via a wireless network access point program that is executed to create a wireless network access point. It will be appreciated that in some examples, different host computing devices may utilize different wireless network interface controllers and associated wireless network access point programs having differing capabilities. Examples of such differing capabilities may include, but are not limited to, RF power requirement management, interference detection and avoidance, channel assignment, authentication, security, etc.

It also will be appreciated that in some examples, different client computing devices may utilize differing operating systems, wireless connection hardware and software, and/or other configurations that may or may not work well with a given host computing device. Additionally, to avoid data bandwidth and throughput issues and associated latency concerns, and depending upon the networking capabilities of the host computing device 14, in some examples the quantity of client computing devices that may be communicatively coupled to the host computing device may be limited.

Accordingly, as noted above and to address one or more of these potential issues, the host computing device 14 also may be capable of establishing a closed wireless network 90 via an external router 88 instead of or in addition to the closed wireless network 42. Advantageously, by utilizing an external router 88, the presentation system 10 may enhance the networking capabilities of the host computing device 14 by providing a more stable and consistent wireless network interface to a variety of client computing devices. Further, an external router 88 may provide greater bandwidth and throughput to enable more client computing devices to communicatively couple with the host computing device.

Figure 3E:
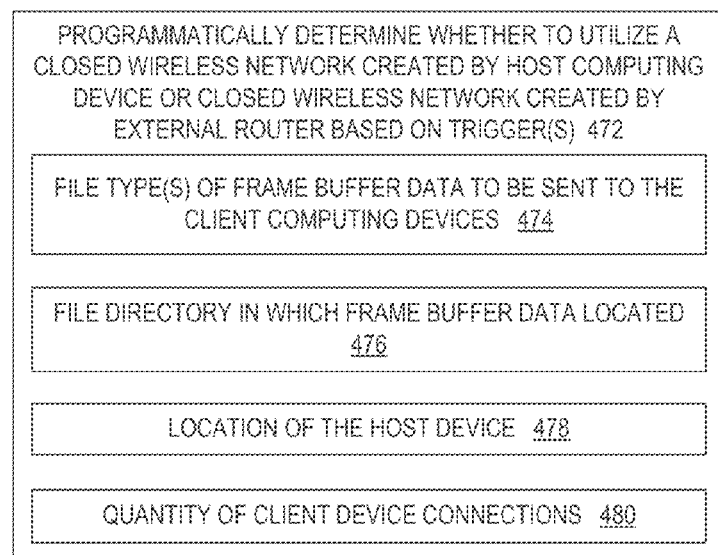

With reference now to FIG. 3E, in some examples at 472 the method 300 may include programmatically determining, based on one or more triggers, whether to establish an encrypted communication session by utilizing a closed wireless network created by the host computing device, or by utilizing a closed wireless network created by an external router.

For example, at 1706 such a determination may be based on a trigger comprising a file type(s) of the frame buffer data that is to be sent to the client computing devices. In some examples, where the frame buffer data comprises file formats that often correspond to smaller files, such as .doc files, .rtf files, etc., the presentation program may utilize a closed wireless network created by the host computing device. In one non-limiting example, a predetermined selection of file formats may be designated as corresponding to smaller files.

In other examples, where the frame buffer data file format(s) may correspond to very large files, such as .mp4 files, .mpg files, .pdf files, etc., the presentation program may utilize a closed wireless network created by an external router to provide more robust data transfer capabilities. In one non-limiting example, a predetermined selection of file formats may be designated as corresponding to very large files.

In another example, at 472 the determination of whether to establish a closed wireless network created by the host computing device or by an external router may be based on a trigger comprising a file directory in which frame buffer data is located. For example, where a file directory contains video files, uncompressed audio files, or other content that can comprise very large files, the presentation program may utilize a closed wireless network created by an external router to provide more robust data transfer capabilities. In other examples, where a file directory contains documents or other content that often comprise smaller files, the presentation program may utilize a closed wireless network created by the host computing device. In some examples, a predetermined selection of file directories may be designated as corresponding to either smaller or larger files.

In another example, at 474 the determination of whether to establish a closed wireless network created by the host computing device or by an external router may be based on a trigger comprising a location of the host computing device. For example and with reference to FIG. 2, the presentation program 26 may determine that the host computing device is located in the conference room 212, which typically hosts meetings having a maximum of 6 people. Accordingly, and where the wireless networking capabilities of a host computing device support simultaneous streaming of frame buffer data to 5 client computing devices, the presentation program may utilize a closed wireless network created by the host computing device.

In another example, the presentation program 26 may determine that the host computing device is located in an auditorium that seats up to 150 people. Accordingly, and given the greater throughput needed to simultaneously stream frame buffer data to such a potentially large number of client computing devices, the presentation program may utilize a closed wireless network created by an external router to provide more robust data transfer capabilities. It will be appreciated that the host computing device may determine its location in any suitable manner, such as by using a Wi-Fi based positioning system or any other suitable method.

In another example, at 478 the determination of whether to establish a closed wireless network created by the host computing device or by an external router may be based on a trigger comprising a quantity of client connections. For example, the presentation program 26 may initially utilize a closed wireless network 42 created by the host computing device to communicatively couple up to a threshold number of client computing devices. Such threshold number may be, for example, 3, 4, 5, 6, 10, 20 or any suitable number. In some examples, the threshold number may be programmatically determined based on one or more hardware and software characteristics and/or configurations of the host computing device.

The presentation program 26 may track the number of client computing devise that connect to the closed wireless network 42. If the threshold number of connections is reached, for subsequent connections of additional client computing devices the presentation program may establish another, separate closed wireless network 90 and corresponding encrypted communication session via the external router 88.

Figure 3F:
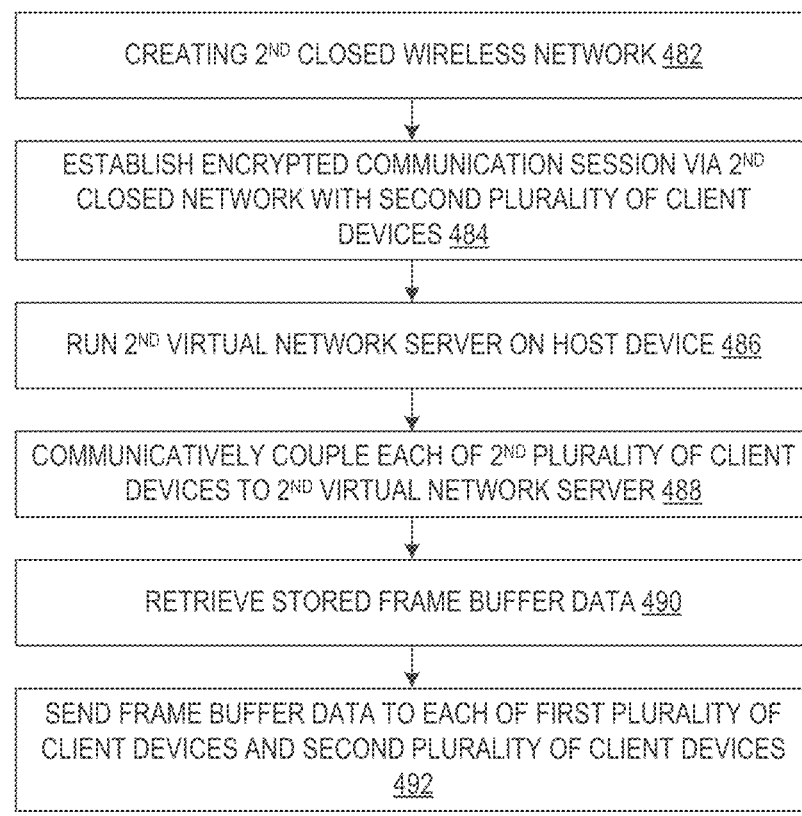

Accordingly, in some examples and with reference now to FIG. 3F, at 482 the method 300 may include creating a second closed wireless network. At 484 the method 300 may include establishing an encrypted communication session via the second closed wireless network with the additional client computing devices beyond the threshold number of connections. It will be appreciated that such additional client computing devices comprise a second, different plurality of client computing devices as compared to the threshold number of client computing devices.

At 486 the method 300 may include running a second virtual network server on the host computing device. In some examples, a second network server may be executed on the external router 88. At 488 the method 300 may include communicatively coupling each of the additional client computing devices to the second virtual network server.

At 490 the method 300 may include retrieving stored frame buffer data. At 492 the method may include sending the frame buffer data to each of the client computing devices connectively coupled to the closed wireless network 42 and to each of the client computing devices connectively coupled to the other second closed wireless network 90. In some examples, and as described in more detail below, the frame buffer data may comprise audio/video data that is streamed from an audio/video file to the client computing devices.

Accordingly, in some examples the presentation program 26 may simultaneously send the same frame buffer data to the client computing devices on the closed wireless network 42 and to the other client computing devices on the closed wireless network 90, via corresponding and separate network servers. In this manner, both groups of client computing devices may receive and display the same frame buffer data at substantially the same time.

Also, it will be appreciated that two or more of the above-described triggers may be used to determine whether to establish an encrypted communication session by utilizing a closed wireless network created by the host computing device, or by utilizing a closed wireless network created by an external router. Similarly, two or more of the above triggers may be used to determine whether to establish two encrypted communication sessions by utilizing a first closed wireless network created by the host computing device and by utilizing a second closed wireless network created by an external router.

In some examples, one or more of the steps of method 300 described above may occur in the background after the presentation program 26 has been launched. Additionally, in some examples a presentation to one or more client computing devices may be initiated via steps of method 300 described above by a single user selection or other input to the host computing device 14. For example and with reference again to FIG. 4, a presentation may be initiated when a presenter selects the Start Presentation button 416 on the user interface 404.

It will be appreciated that method 300 is provided by way of example and is not meant to be limiting. Therefore, it is to be understood that method 300 may include additional and/or alternative steps than those illustrated in FIGS. 3A, 3B, 3C, 3D, 3E, and 3F. Further, it is to be understood that the steps of method 300 may be performed in any suitable order. Further still, it is to be understood that one or more steps may be omitted from method 300 without departing from the scope of this disclosure.

Figure 8B:
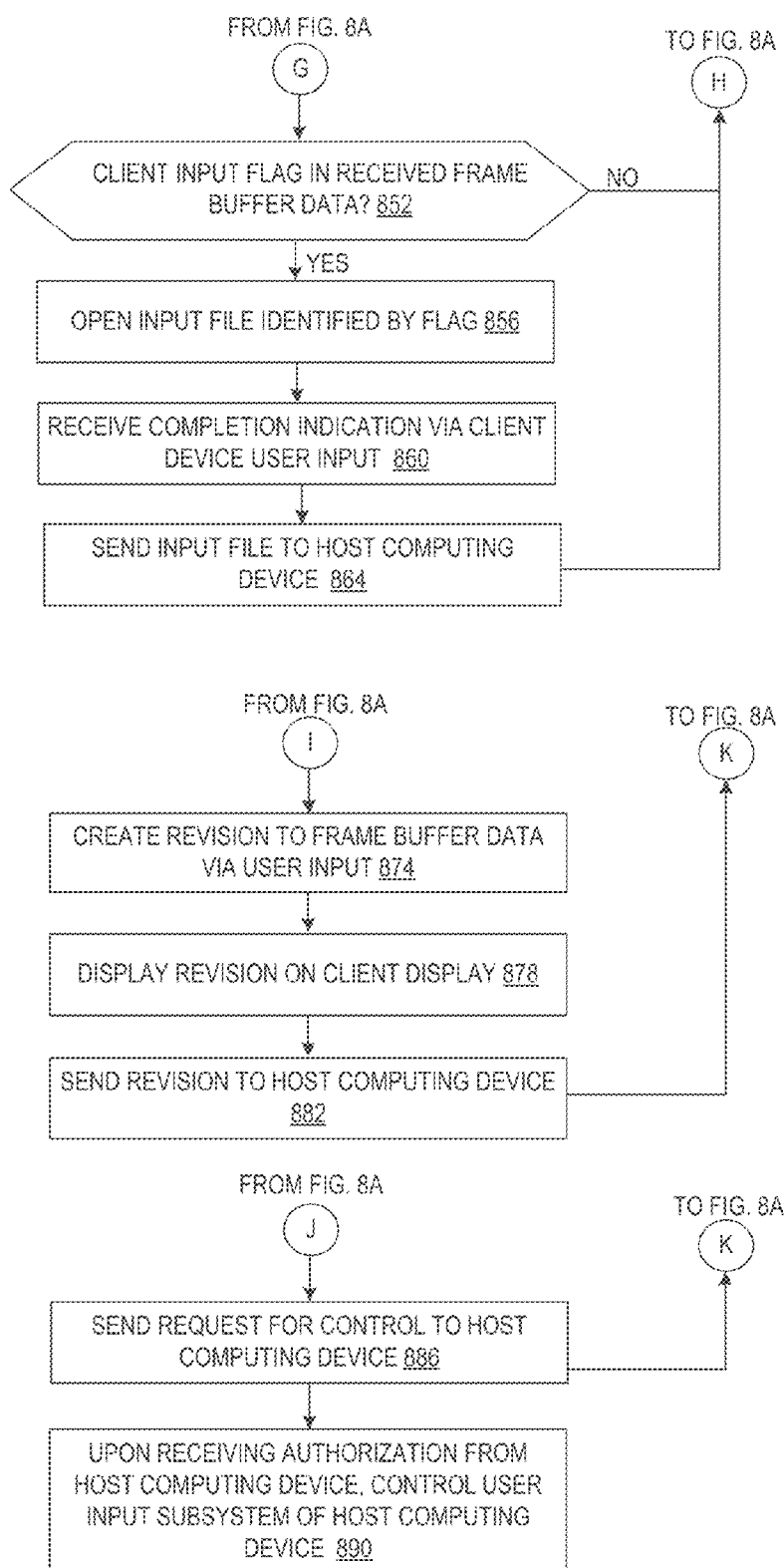

With reference now to FIGS. 8A and 8B, an example of the presentation system 10 will now be provided with reference to a flow chart of a method 800 for receiving at a client computing device a presentation from a host computing device 14 via a closed wireless network 42. The following description of method 800 is provided with reference to the software and hardware components of the presentation system 10 described and shown herein. In particular, method 800 is described with reference to the viewing program 54 that may be executed by a processor of a client computing device. It will be appreciated that the viewing program 54 may be configured to perform one or more of the steps of method 800 described below. It will also be appreciated that method 800 may also be performed in other contexts using other suitable hardware and software components.

With reference to FIG. 8A and upon powering up the client computing device, at 804 the method 800 may include starting a priority program 74 stored in a mass storage of the client computing device. At 808 the priority program 74 may be executed by a processor of the client computing device to determine whether the viewing program 54 is the current foreground application running in the foreground of the client computing device. In one example, after power up the viewing program 54 may not be running. In this example, at 816 the priority program 74 may be configured to start the viewing program 54.

In another example the viewing program 54 may have been previously launched. In this example and at 808, if the viewing program 54 is the currently running foreground application, then the viewing program 54 may continue to operate as described in more detail below. At 812 the priority program 74 may subsequently recheck whether the viewing program 54 is the current foreground application at defined intervals.

Continuing with 808, if a different program is the current foreground application, then at 816 the priority program 74 may relaunch the viewing program 54 as the current foreground application. For example, while the viewing program 54 is the current foreground application, a recipient user of the client computing device may select and launch another application, navigate to a device desktop view, or otherwise relegate the viewing program 54 to a background application status. Upon determining that the viewing program 54 has a background application status, the priority program 74 may relaunch the viewing program as the foreground application.

In other examples, the priority program 74 may be configured to allow the recipient user of the client computing device to select and launch another application or otherwise navigate away from the viewing program 54 while the viewing program 54 is running. In these examples, the viewing program 54 may continue to run as a background application.

Figure 7:
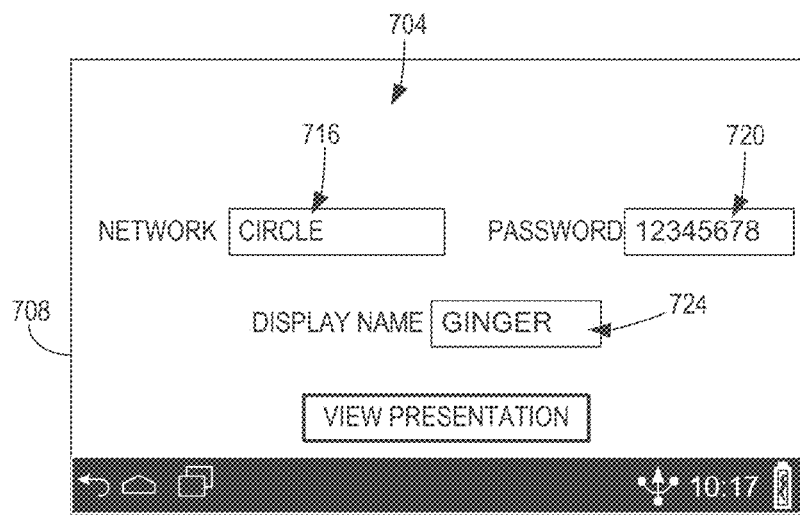
FIG. 7 is a schematic illustration of a user interface displayed on a client computing device according to an example of the present disclosure.

At 820 and with reference also to FIG. 7, the viewing program 54 may be configured to display a client user interface 704 on a client touchscreen display 708 of a client computing device. The client user interface 704 may be populated with user parameters saved in a storage subsystem of the client computing device. In one example, the user parameters may include network credentials such as a network name 716 and a password 720. In some examples, a user display name 724 may be an additional parameter that may populate the client user interface 704. As described in more detail below, in examples where a user may interact with the host computing device 14, the user display name 724 may be displayed on the host computing device along with interactions received from that user via the client computing device, thereby enabling the presenter to know which user/recipient is participating in the interaction.

In another example where saved parameters are not available, the viewing program 54 may be configured to collect and validate user parameters via user input to the client computing device.

At 828 the viewing program 54 may be configured establish a WiFi network connection to the closed wireless network 42 established by the host computing device 14. Such a connection will be established when the network name 716 and password 720 parameter values match corresponding parameter values stored in the host computing device 14. As described above, it will also be appreciated that the WiFi network connection may be encrypted via WPA encryption. At 832 the viewing program 54 may be configured to obtain an IP address from the closed wireless network 42. The viewing program 54 may utilize a DHCP client to obtain an IP address from the DHCP server running on the host computing device 14.

At 836 the viewing program 54 may be configured to establish an IP network connection to the virtual network server 36 running on the host computing device 14. At 840 the viewing program 54 may be configured to automatically configure the virtual network client for the virtual network server 36. At 844 the viewing program 54 may be configured to request frame buffer data 56 from the host computing device 14 via a frame buffer request 66. At 848 the viewing program 54 may be configured to receive frame buffer data 56 from the host computing device 14.

Turning now to FIG. 8B and in some examples, at 852 the viewing program 54 may be configured to determine whether a client input flag is included with the received frame buffer data 56. If a client input flag is not included with the received frame buffer data 56, then in FIG. 8A at 868 the viewing program 54 may be configured to draw the received frame buffer data 56 to the client display of the client computing device. If a client input flag is included with the received frame buffer data 56, then at 856 the viewing program 54 may be configured to open an input file identified by the input flag. In some examples, the input file may be stored locally in a storage subsystem of the client computing device.

The input file may correspond to an input request as described above. Examples of input files may include, but are not limited to, survey applications for collecting feedback from users of client computing devices, signature applications for collecting signatures from users of client computing devices, and voting applications for collecting votes from users of client computing devices. User input provided in response to the input request may be saved in the input file.

At 860 the viewing program 54 may be configured to receive a completion indication via user input to the client computing device. Such a completion indication may include, but is not limited to, a user selecting a "Submit" button in an application collecting feedback from the user. At 864 the viewing program may be configured to send the saved input file to the host computing device 14. Returning now to FIG. 8A, at 868 the viewing program 54 may be configured to draw received frame buffer data 56 to the client display 62 of the client computing device.

At 870 the viewing program 54 may be configured to determine if a server session failure or disconnect has occurred. If a server session failure or disconnect has occurred, then at 816 the viewing program 54 may be relaunched. If a server session failure or disconnect has not occurred, then at 872 the viewing program 54 may determine if an end command has been received from the client computing device. If an end command has been received, then the viewing program 54 may be terminated. If an end command has not been received, then at 844 the viewing program may be configured to continue requesting frame buffer data 56 from the host computing device 14.

Returning to FIG. 8B and in some examples, at 874 the viewing program 54 may be configured to create a revision to the frame buffer data 56 via user input to the client computing device. As described above with reference to FIG. 5, in one example a recipient may create a revision to frame buffer data 56 by tapping an icon 512 displayed on the surface of the touchscreen display 500 to highlight the icon. In response to the recipient's input, at 878 the viewing program 54 may be configured to display an encircling ring 510 surrounding the icon 512 on the display 500 of the client computing device 504. At 882 the viewing program 54 may be configured to send the revision to the host computing device 14. Returning now to FIG. 8A and 870, the viewing program 54 may be configured to determine if a server session failure or disconnect has occurred as described above.

As described above, in some examples the viewing program 54 may also be configured to prevent revision to the frame buffer data via user input to the client computing device.

Returning to FIG. 8B and in some examples, at 886 the viewing program 54 may be configured to send a request for control to the client computing device 14. At the host computing device 14, the presentation program 26 may highlight on the host display 58 the display name of the recipient that is requesting control. The host computing device 14 may accept the recipient's request and authorize the requesting client computing device to assume control of the host computing device.

At 890, upon receiving authorization from the host computing device 14, the viewing program 54 may be configured to assume control of the host computing device 14. In some examples, the client computing device may control one or more user input subsystems of the host computing device 14, such keyboard and mouse input associated with the host computing device. Returning now to FIG. 8A and 870, the viewing program 54 may be configured to determine if a server session failure or disconnect has occurred as described above.

With continued reference to FIG. 8A, the viewing program 54 may also periodically determine whether network and/or server connections have failed. For example, after establishing the WiFi connection at 828, at 892 the viewing program 54 may determine if a WiFi connection failure has occurred. If a WiFi connection failure has not occurred, the viewing program 54 may continue operation. If a WiFi connection failure has occurred, at 816 the viewing program may be relaunched.

In another example, after obtaining an IP address at 832, at 894 the viewing program 54 may determine if a DHCP failure has occurred. If a DHCP failure has not occurred, the viewing program 54 may continue operation. If a DHCP failure has occurred, at 816 the viewing program may be relaunched.

In another example, after establishing a network connection at 836, at 896 the viewing program 54 may determine if a network connection failure has occurred. If a network connection failure has not occurred, the viewing program 54 may continue operation. If a network connection failure has occurred, at 816 the viewing program may be relaunched. It will be appreciated that the viewing program 54 may also check for system failures or disconnections as described above at various points and timeframes throughout the operation of the viewing program.

It will be appreciated that method 800 is provided by way of example and is not meant to be limiting. Therefore, it is to be understood that method 800 may include additional and/or alternative steps than those illustrated in FIGS. 8A and 8B. Further, it is to be understood that method 800 may be performed in any suitable order. Further still, it is to be understood that one or more steps may be omitted from method 800 without departing from the scope of this disclosure.

In another example, a presenter may utilize the closed wireless network 42 and/or closed wireless network 90 to stream a presentation or portion of a presentation comprising audio and/or video data to one or more client computing devices. As noted above, the data may take the form of a movie, video clip, slideshow, audio file, or other type of audio/video data. In different examples the audio/video data 84 may comprise audio only data, video only data, or audio and video data.

Figure 9:
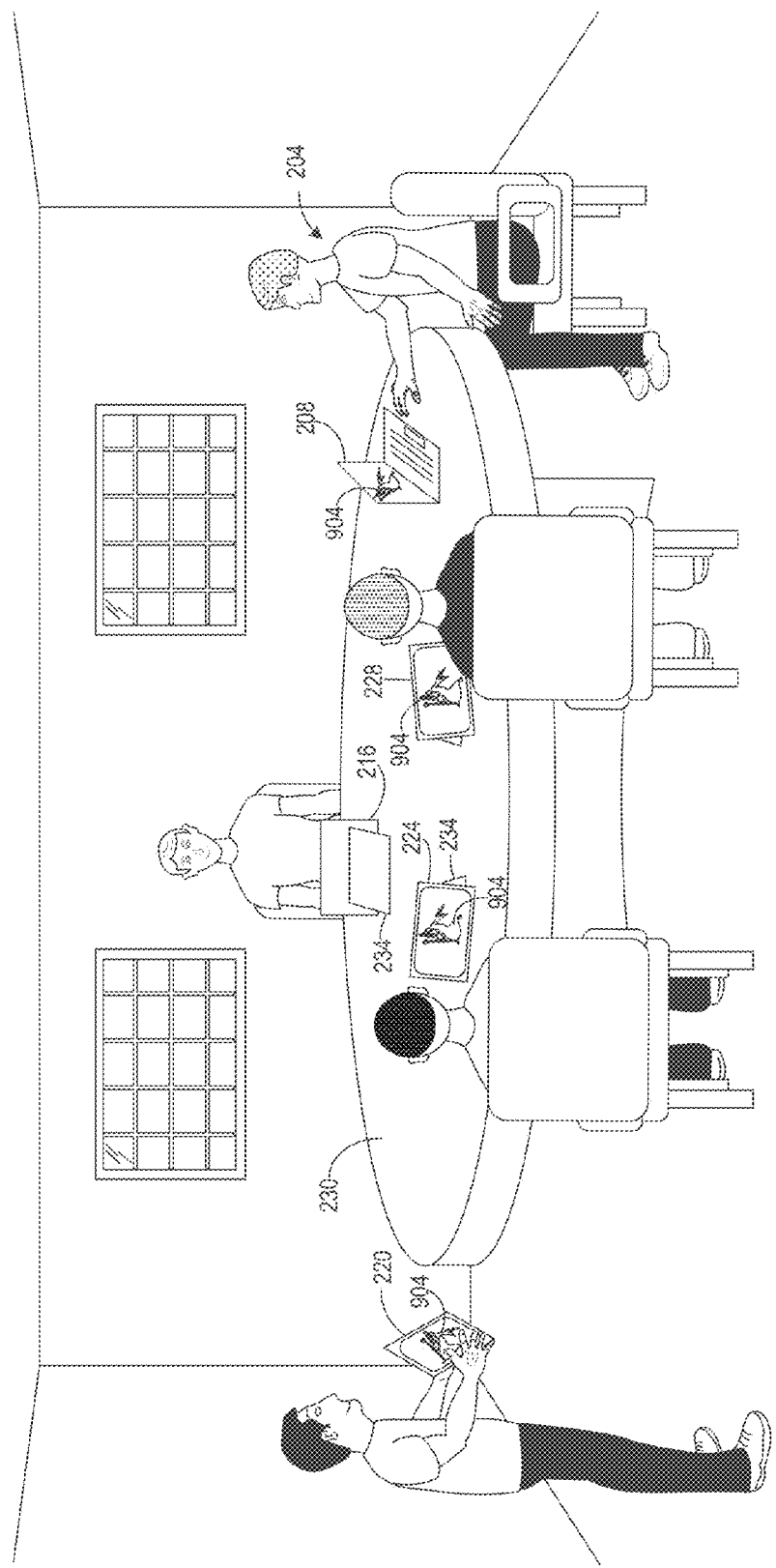
FIG. 9 is a schematic perspective view of a room including a presenter using a host computing device and four recipients using client computing devices according to another example of the present disclosure.

Turning now to FIG. 9, in one example use case the sales professional presenter 204 may have an electronic presentation that includes a video clip describing his company's new video game. As described above, the presentation program 26 on the host computing device 14 in the form of laptop 208 may programmatically establish a virtual WiFi access point to create a closed wireless network to which each of the client computing devices 216, 220, 224, and 228 (tablets) are automatically connected. An encrypted communication session is then established between the laptop 208 and the tablets.

Also as explained above, the presentation program 26 programmatically runs a virtual network server 36 via the laptop 208 to which each of the tablets is communicatively coupled. In this example, the presenter 204 may securely stream the video clip to one or more of the client computing devices 216, 220, 224, and 228 via the encrypted communication session. Further and as described in more detail below, the closed wireless network combined with the virtual network server 36 enables the sharing of high quality videos with minimum interruptions.

As shown in the example of FIG. 9, the presenter 204 may stream the video clip 904 to each of the client computing devices 216, 220, 224, and 228. In some examples, the video clip 904 may be streamed simultaneously to each of the client computing devices 216, 220, 224, and 228. In other examples the video clip 904 may be streamed asynchronously to two or more of the client computing devices 216, 220, 224, and 228.

During a presentation, the presenter 204 can issue a command, such as a context menu selection, to start streaming a video to one or more of the client computing devices 216, 220, 224, and 228. The presentation program 26 may send a message to each of the selected client computing devices 216, 220, 224, and 228, with the message including the command and a resource locator, such as a Uniform Resource Locator (URL), identifying the location of an audio/visual file stored on the laptop 208.

Each of the client computing devices 216, 220, 224, and 228 may then parse the command and make an HTTP request for the URL in the media player program 80 on each device. The HTTP request is sent to the presentation program 26. Upon receiving the request for the URL, the presentation program 26 may initiate streaming of audio/video data 84 of the audio/visual file to the client computing devices 216, 220, 224, and 228. The audio/visual data is then displayed on the client displays of the client computing devices 216, 220, 224, and 228 via their media player programs 80. In this manner, the audio/visual data is configured to modify the client display of each of the client computing devices.

Figure 10:
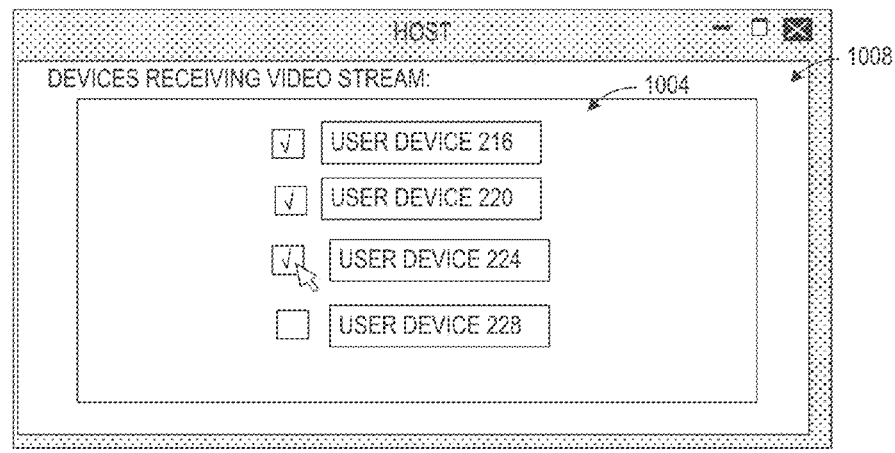
FIG. 10 is a schematic illustration of a viewer list user interface displayed on a host computing device according to an example of the present disclosure.

In some examples, the presenter may select a subset of the client computing devices 216, 220, 224, and 228 to receive the video clip. For example, after beginning a presentation in which captured frame buffer data 56 is shared with each of the client computing devices 216, 220, 224, and 228, the presenter 204 may desire to share the video clip 904 with only client computing devices 216, 220, 224, and not share it with client computing device 228. In this example and with reference to FIG. 10, the presenter may select client computing devices 216, 220, 224 via a viewer list menu 1004 on a viewer list user interface 1008 to receive the stream of the video clip. In this example, the client computing device 228 may continue to receive captured frame buffer data 56 from the laptop 208.

In other examples, different URLs corresponding to different audio/video files may be sent to different client computing devices. In this manner, different client computing devices may stream different audio/video files via the host computing device 14. For example and with reference again to FIG. 9, the presenter 204 may desire to share video clip 904 with client computing devices 216 and 220, and share a different video clip with client computing devices 224 and 228.

Accordingly, the presentation program 26 may send to client computing devices 216 and 220 a first URL identifying the location of a first audio/video file containing the video clip 904 stored on the laptop 208. The presentation program 26 may also send to client computing devices 224 and 228 a second URL identifying the location of a second audio/video file containing a different video clip stored on the laptop 208. In this manner, client computing devices 216 and 220 may stream and display the video clip 904 and client computing devices 224 and 228 may stream and display different audio/video data located at the second URL.

In the example shown in FIG. 9, the laptop 208 of the presenter 204 is displaying the video clip 904 that is being streamed to the client computing devices 216, 220, 224, and 228. In other examples, the presentation program 26 may display the video clip 904 in a small window on the screen of the laptop 208 while also displaying another portion of a presentation on the screen. In this manner, the presenter 204 may monitor the video clip 904 that is streaming to one or more of the client computing devices 216, 220, 224, and 228, while simultaneously viewing the other portion of the presentation, such as a slideshow. It will be appreciated that in some examples the video clip 904 may be integrated within another presentation, such as a slideshow.

Figure 11:
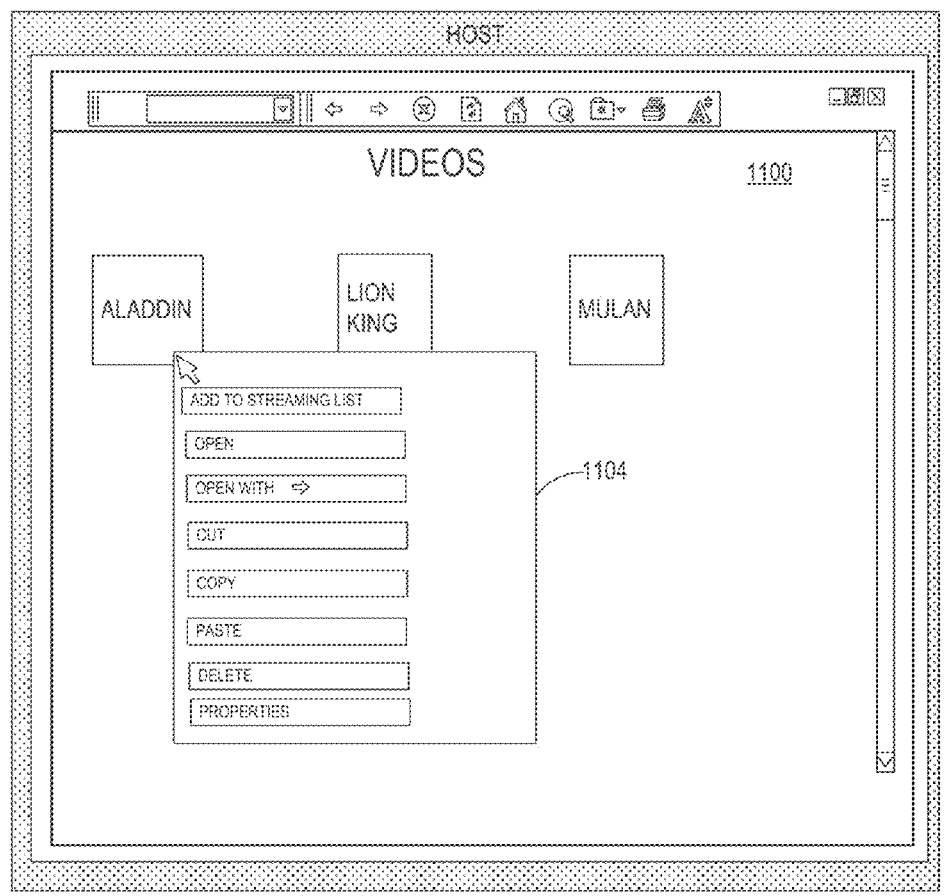
FIG. 11 is a schematic illustration of a Videos file screen displayed on a host computing device according to an example of the present disclosure.

Turning now to FIG. 11, the presenter 204 may select one or more audio/video files stored in a storage subsystem of the laptop 208 to add to a streaming list. In one example, the presenter 204 may browse to a Videos file screen 1100 that displays video files stored on the laptop 208. The presenter may select a file, such as the movie file named Aladdin, and right-click to bring up a context menu 1104. The context menu 1104 contains the option to "Add to Streaming List". In some examples, this option may be selectable if the selected file(s) is in a supported media format. In other examples, this option is selectable regardless of the media format of the selected file.

When the presenter selects "Add to Streaming List" from the context menu, the selected movie file "Aladdin" is queued for conversion to a compressed format suitable for viewing and streaming in a closed network session. For example, a codec (not shown) on host computing device 14 may encode a video file to a video compression format, such as H.264/MPEG-4 AVC, using standard video conversion tools. In this manner, the file size of the video may be reduced. It will be appreciated that any suitable file format may be used according to the type of video or audio file being converted. Other examples of possible video compression formats include, but are not limited to, MPEG-2 Part 2, MPEG-4 PART 2, and Dirac. Examples of possible audio compression formats include, but are not limited to, MP3, AAC, and AC-3. It will also be appreciated that audio/video files may take the form of a multimedia container format such as, for example, AVI, MP4, MOV, FLV or other suitable container format.

Figure 12:
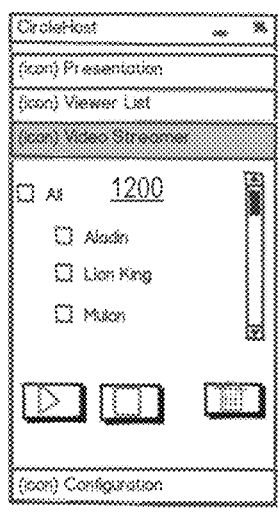
FIGS. 12, 13 and 14 are schematic illustrations of a Video Streamer Panel and Streaming List displayed on a host computing device according to an example of the present disclosure.
Figure 13:
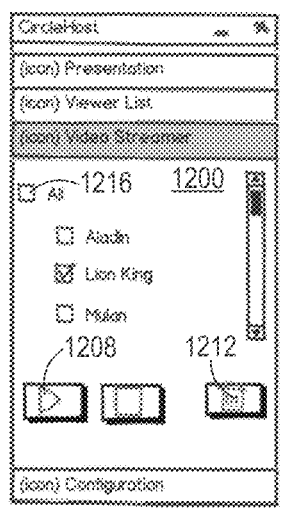
Figure 14:
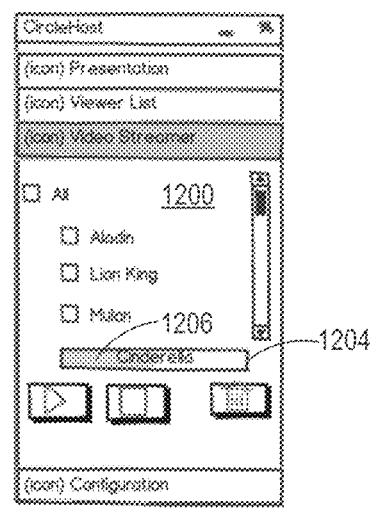

Turning now to FIGS. 12-14, once audio/video files are converted, corresponding audio/video file indicators are added to a Streaming List 1200. In FIG. 12 the file indicators Aladdin, Lion King, and Mulan are shown. The presenter 204 may view the Streaming List 1200 that shows the audio/visual files that are available for streaming to the client computing devices. Each of the displayed audio/video files is in a file format, such as H.264/MPEG-4 AVC, that is suitable for streaming to one or more of the client computing devices. For example, during a presentation and when the presenter 204 is ready to share a video, the presenter can view the Streaming List 1200 and select a video to stream, such as the Lion King video as shown in FIG. 13.

When the presenter 204 selects a video to stream and selects a Play button 1208, the presentation program 26 sends a command and a resource locator, such as a uniform resource locator (URL), to one or more of the client computing devices, such as client computing device 228. The URL includes a network location of the selected audio/video file stored on the host computing device 14. In response to receiving the command and URL, the viewing program 54 on client computing device 228 sends a request for the resource locator that is received by the host computing device 14. In response to receiving the request, the host computing device 14 via the presentation program 26 streams audio/video data 84 from the selected audio/video file to the media player program 80 on the client computing device 228. The media player program 80 is controlled to decode and play the audio/video data 84 via the display and/or speakers of the client computing device.

With reference to FIG. 14, a now-playing button 1204 may display the title of an audio/video file that is currently being streamed to one or more of the client computing devices. In some examples, selecting the now-playing button 1204 may open a window on the display 58 of the host computing device 14 in which the currently streaming audio/video file is shown. In some examples, the now-playing button 1204 may include a progress indicator 1206 that visually depicts the portion of the audio/video file that has been streamed and the portion that remains.

Additionally and as shown in FIGS. 12-14, the Video Streamer panel may include a Play button 1208 that, when selected, streams each video selected in the Video Streamer panel in sequential order. In some examples, when the Play button 1208 is selected while a currently-playing video is being streamed, streaming of the video may be paused. In some examples when a currently-playing video is being streamed and a different audio/video file is selected in the streaming list 1200, selection of the Play button 1208 may stop the streaming of the currently-playing video and start the streaming of the selected audio/video file. In addition, selective control of streaming enables two data flows within the same VNC session.

The Video Streamer panel may include a Trash button 1212 that deletes one or more videos selected in the Video Streamer panel. In this example only the compressed version of the audio/video files is deleted, while the original audio/video file stored on the host computing device 14 is not deleted. The Video Streamer panel may include an All selectable box 1216 that selects all of the videos shown in the Video Streamer panel. In some examples the displayed names of the audio/video files are selectable and may be reordered by the presenter 204 via dragging to change the play order.

In some examples, the presenter 204 may configure the presentation program 26 to prevent the media player programs 80 on the client computing devices from controlling or interrupting the streaming of audio/video data 84. In other examples, the presentation program 26 may be configured to allow the presenter 204 to selectively enable media player programs 80 on one or more of the client computing devices to control or interrupt the streaming of audio/video data 84. In other examples, the presentation program 26 may be configured to automatically enable media player programs 80 on the client computing devices to control or interrupt the streaming of audio/video data 84. In other examples, the audio/video file may be located on a remote server 72 and may be streamed to one or more client computing devices via the host computing device 14.

In other examples, multiple video streams may be provided in one encrypted communication session. In this manner, video conferencing among a host computing device and one or more client computing devices that are located remotely from one another may be facilitated. Audio and video data from the host and client computing devices may be captured using cameras and microphones in the devices. Along with this audiovisual information, the identification data from each of the devices would also be available. Accordingly, the captured data may be tagged with the specific device information corresponding to the source of that data. Such captured and tagged data may flow back to the host computing device through the encrypted communication session and/or from remote devices via an external network connection of the host computing device.

The host computing device may then distribute the captured data among the client computing devices participating in the videoconference. As noted above, the audiovisual information includes device ID data identifying the source of the information. Accordingly, the source device of particular audiovisual information can be identified. During videoconferencing sessions, the host computer may show the audiovisual information from specific selected devices, and may switch among the meeting participants to allow for all participants to view the audiovisual information from specific device.

Figure 15:
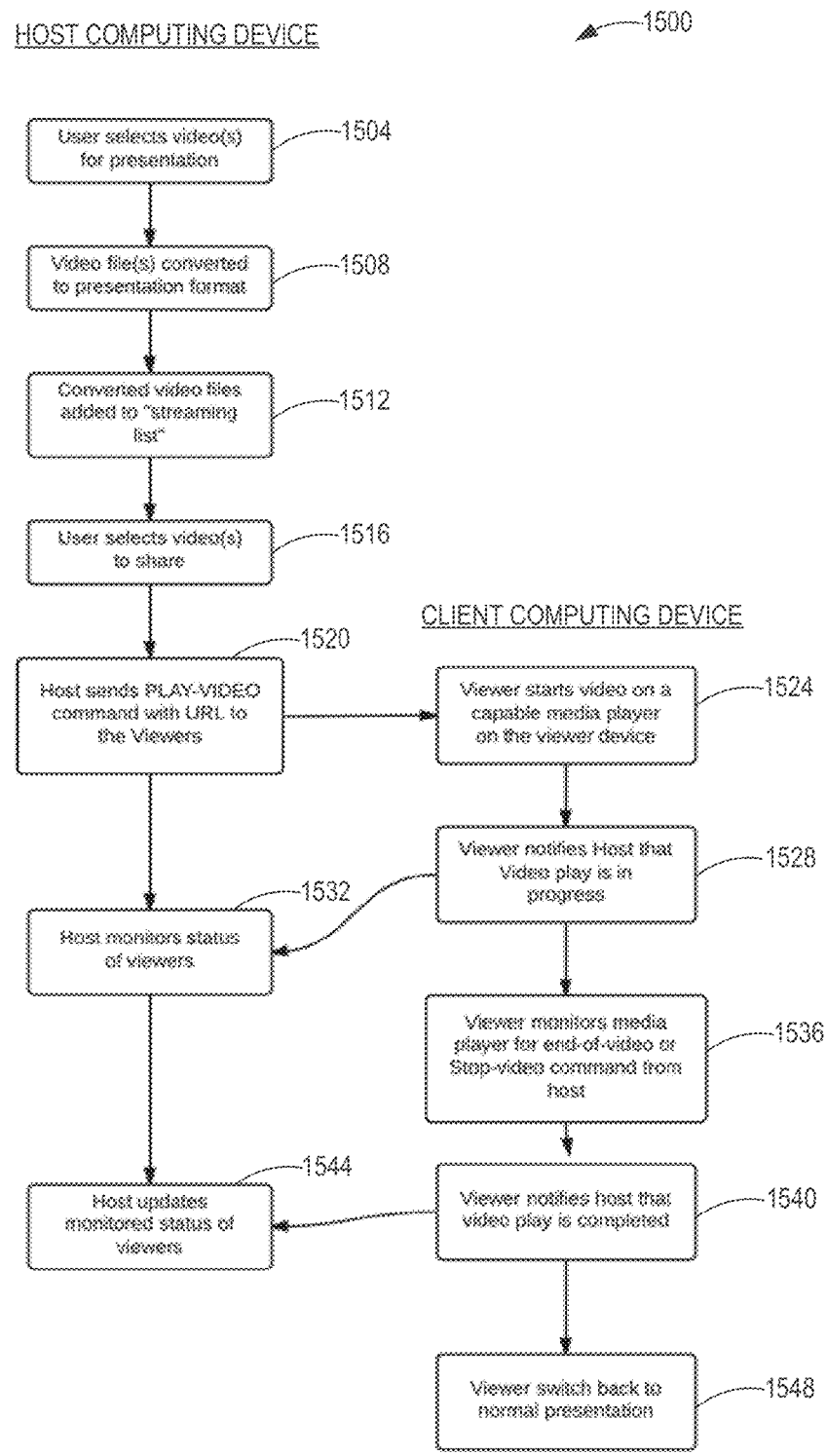
FIG. 15 is a flow chart of a method for viewing a presentation including video via a closed wireless network according to an example of the present disclosure.

FIG. 15 illustrates a flow chart of a method 1500 for delivering a presentation including audio/video data via a closed wireless network. The following description of method 1500 is provided with reference to the software and hardware components of the presentation system 10 described and shown herein. It will be appreciated that method 1500 may also be performed in other contexts using other suitable hardware and software components.

At 1504 the method 1500 may include selecting one or more videos to be made available for presentation to one or more client computing devices. At 1508 the method 1500 may include converting the selected video file(s) into a compressed format for presentation. At 1512 the method 1500 may include adding the converted video file(s) to a streaming list. At 1516 the method 1500 may include selecting one or more of the videos to stream to one or more client computing devices. At 1520 the method 1500 may include sending a Play-Video command along with a URL identifying a location of the selected video to the one or more client computing devices (Viewers).

At 1524 and on a client computing device (Viewer), a viewing program may begin streaming the video from the URL via a media player program on the client computing device. At 1528 the method 1500 may include notifying the host computing device that video play is in progress on the client computing device. At 1532 the host computing device may monitor the status of the client computing devices that received the Play-Video command and URL.

At 1536 the method 1500 may include the client computing device monitoring the media player program for an end-of-video indicator, and determining whether a Stop-Video command has been received from the host computing device. At 1540 the method 1500 may include notifying the host computing device that video play of the selected video is completed. At 1544 the method 1500 may include the host computing device updating the monitored status of each of the client computing devices. At 1548 the method 1500 may include the client computing device switching from video playback via the media player program to a normal presentation mode.

It will be appreciated that method 1500 is provided by way of example and is not meant to be limiting. Therefore, it is to be understood that method 1500 may include additional and/or alternative steps than those illustrated in FIG. 15. Further, it is to be understood that method 1500 may be performed in any suitable order. Further still, it is to be understood that one or more steps may be omitted from method 1500 without departing from the scope of this disclosure.

FIGS. 16A, 16B and 16C illustrate a flow chart of a method 1600 for delivering a presentation via a closed wireless network. The following description of method 1600 is provided with reference to the software and hardware components of the presentation system 10 described and shown herein. It will be appreciated that method 1600 may also be performed in other contexts using other suitable hardware and software components.

At 1604 the method 1600 may include establishing a wireless network access point that creates the closed wireless network. At 1606 the method 1600 may include establishing an encrypted communication session via the closed wireless network with a plurality of client computing devices, each of the client computing devices comprising a client display. At 1608 the method 1600 may include running a virtual network server on the host computing device. At 1610 the method 1600 may include communicatively coupling each of the client computing devices to the virtual network server.

At 1612 the method 1600 may include sending a resource locator to the plurality of client computing devices, wherein the resource locator includes a network location of an audio/video file stored on the host computing device. At 1614 the method 1600 may include receiving a request for the resource locator from the plurality of client computing devices. At 1616 the method 1600 may include, in response to receiving the request, streaming audio/video data from the audio/video file to the plurality of client computing devices, wherein the audio/video data is configured to modify the client display of each of the client computing devices.

At 1618 the method 1600 may include streaming the audio/video data asynchronously to two or more of the plurality of client computing devices. At 1620 the method 1600 may include selecting a subset of the plurality of client computing devices. At 1622 the method 1600 may include streaming the audio/video data to only the subset of the plurality of client computing devices.

With reference now to FIG. 16B, at 1624 the method 1600 may include communicatively coupling the host computing device to an external router that creates the closed wireless network. At 1626, wherein the closed wireless network is a first closed wireless network, the virtual network server is a first virtual network server, and the plurality of client computing devices is a first plurality of client computing devices, the method 1600 may include creating a second closed wireless network. At 1628 the method 1600 may include establishing an encrypted communication session via the second closed wireless network with a second, different plurality of client computing devices, each of the second, different plurality of client computing devices comprising a client display.

At 1630 the method 1600 may include running a second virtual network server on the host computing device. At 1632 the method 1600 may include communicatively coupling each of the second, different plurality of client computing devices to the second virtual network server. At 1634 the method 1600 may include sending the resource locator to the second, different plurality of client computing devices.

At 1636 the method 1600 may include receiving a request for the resource locator from the second, different plurality of client computing devices. At 1638 the method 1600 may include, in response to receiving the request, streaming audio/video data from the audio/video file to the second, different plurality of client computing devices, wherein the audio/video data is configured to modify the client display of each of the second, different plurality of client computing devices.

At 1640 and wherein the closed wireless network is a first closed wireless network, the method 1600 may include, based on one or more triggers, programmatically determining whether to establish the encrypted communication session via the first closed wireless network or via a second closed wireless network created by communicatively coupling the host computing device to an external router. At 1642 the one or more triggers may comprise at least one of a file type of frame buffer data, a file directory in which the frame buffer data is located, a physical location of the host computing device, and a quantity of the client computing devices.

With reference now to FIG. 16C, and wherein the resource locator is a first resource locator, the network location is a first network location, the audio/video data is first audio/video data, and the audio/video file is a first audio/video file, at 1644 the method 1600 may include sending a second resource locator to another client computing device that is not one of the plurality of client computing devices, wherein the second resource locator includes a network location of a second audio/video file stored on the host computing device. At 1646 the method 1600 may include receiving a request for the second resource locator from the other client computing device. At 1648 the method 1600 may include, in response to receiving the request from the other client computing device, streaming the second audio/video data from the second audio/video file to the other client computing device, wherein the second audio/video data is configured to modify the client display of the other client computing device.

At 1650 the method 1600 may include selectively enabling one or more of the plurality of client computing devices to control or interrupt the streaming of the audio/video data. At 1652 the method 1600 may include receiving shared audio/video data from a sharing client computing device of the plurality of client computing devices. At 1654 the method 1600 may include streaming the shared audio/video data from the sharing client computing device to one or more of the plurality of client computing devices. At 1656 the method 1600 may include freezing the client display of one or more of the plurality of client computing devices.

It will be appreciated that method 1600 is provided by way of example and is not meant to be limiting. Therefore, it is to be understood that method 1600 may include additional and/or alternative steps than those illustrated in FIG. 16. Further, it is to be understood that method 1600 may be performed in any suitable order. Further still, it is to be understood that one or more steps may be omitted from method 1600 without departing from the scope of this disclosure.

FIG. 17 illustrates a flow chart of a method 1700 for delivering a presentation via a closed wireless network using an external router. The following description of method 1700 is provided with reference to the software and hardware components of the presentation system 10 described and shown herein. It will be appreciated that method 1700 may also be performed in other contexts using other suitable hardware and software components.

At 1704 the method 1700 may include establishing a wireless network access point in a host computing device. At 1708 the method 1700 may include communicatively coupling the host computing device to an external router. At 1712 the method 1700 may include, based on one or more triggers, programmatically establishing an encrypted communication session with a plurality of client computing devices via either a first closed wireless network created by the wireless network access point or via a second closed wireless network created by the external router.

At 1716 the method 1700 may include running a virtual network server on the host computing device. At 1720 the method 1700 may include communicatively coupling each of the client computing devices to the virtual network server. At 1724 the method 1700 may include retrieving frame buffer data stored in a storage subsystem of the host computing device. At 1728 the method 1700 may include sending the frame buffer data to each of the client computing devices to thereby modify a client display of each of the client computing devices.

It will be appreciated that method 1700 is provided by way of example and is not meant to be limiting. Therefore, it is to be understood that method 1700 may include additional and/or alternative steps than those illustrated in FIG. 17. Further, it is to be understood that method 1700 may be performed in any suitable order. Further still, it is to be understood that one or more steps may be omitted from method 1700 without departing from the scope of this disclosure.

Figure 18:
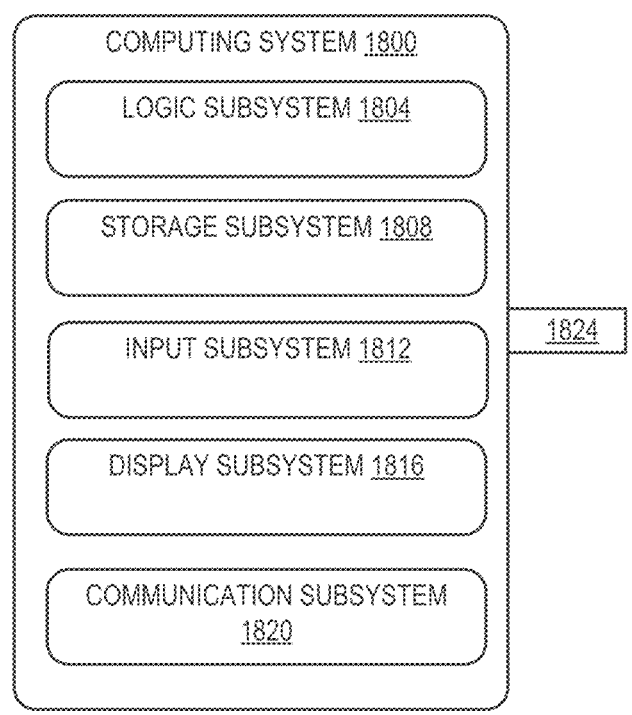
FIG. 18 is a simplified schematic illustration of an example of a computing device.

FIG. 18 schematically shows a nonlimiting example of a computing system 1800 that may perform one or more of the above described methods and processes. Host computing device 14 and the client computing devices described above may take the form of computing system 1800. Computing system 1800 is shown in simplified form. It is to be understood that virtually any computer architecture may be used without departing from the scope of this disclosure. In different examples, computing system 1800 may take the form of a desktop computing device, a mobile computing device such as a tablet computer, laptop, notebook, smart phone, or other suitable type of computing device.

As shown in FIG. 18, computing system 1800 includes a logic subsystem 1804, a storage subsystem 1808 and an input subsystem 1812. Computing system 1800 may further include a display subsystem 1816, a communication subsystem 1820, and/or other subsystems and components not shown in FIG. 18. Computing system 1800 may also include computer readable media, with the computer readable media including computer readable storage media and computer readable communication media. Computing system 1800 may also optionally include other user input devices such as keyboards, mice, touchpads, and/or touch screens, for example. Further, in some examples the methods and processes described herein may be implemented as a computer application, computer service, computer API, computer library, and/or other computer program product.

Logic subsystem 1804 may include one or more physical devices configured to execute one or more instructions. For example, the logic subsystem 1804 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1804 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing.

Storage subsystem 1808 may include one or more physical, computer readable memory devices configured to hold data and/or instructions executable by the logic subsystem 1804 to implement the herein described methods and processes. When such methods and processes are implemented, the state of storage subsystem 1808 may be transformed (e.g., to hold different data).

Storage subsystem 1808 may include removable computer readable media devices and/or built-in computer readable memory devices. Storage subsystem 1808 may include optical computer readable memory devices (e.g., CD, DVD, HD-DVD, Blu-Ray Disc, etc.), semiconductor computer readable memory devices (e.g., RAM, EPROM, EEPROM, etc.) and/or magnetic computer readable memory devices (e.g., hard disk drive, floppy disk drive, tape drive, MRAM, etc.), among others. Storage subsystem 1808 may include devices with one or more of the following characteristics: volatile, nonvolatile, dynamic, static, read/write, read-only, random access, sequential access, location addressable, file addressable, and content addressable. The term "computer readable memory device" excludes propagated signals per se.

In some examples, aspects of logic subsystem 1804 and storage subsystem 1808 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 18 also shows an aspect of the storage subsystem 1808 in the form of removable computer readable memory device 1824, which may be used to store data and/or instructions executable to implement the methods and processes described herein. Removable computer readable memory device 1824 may take the form of an EEPROM such as a flash drive, CD, DVD, HD-DVD, Blu-Ray Disc, and/or floppy disk, among others.

In some examples, aspects of the instructions described herein may be propagated by a pure signal (e.g., an electromagnetic signal, an optical signal, etc.) via a transmission medium, rather than a computer readable memory device. Furthermore, data and/or other forms of information pertaining to the present disclosure may be propagated by a pure signal via computer readable communication media.

Input subsystem 1812 may comprise or interface with one or more user-input devices such as a keyboard, mouse, touchpad, touch screen, microphone, camera, etc.

Display subsystem 1816 may be used to present a visual representation of data held by storage subsystem 1808. As the above described methods and processes change the data held by the storage subsystem 1808, and thus transform the state of the storage subsystem, the state of the display subsystem 1816 may likewise be transformed to visually represent changes in the underlying data. The display subsystem 1816 may include one or more display devices utilizing virtually any type of technology. Such display devices may be combined with logic subsystem 1804 and/or storage subsystem 1808 in a shared enclosure. The display subsystem 1816 may include, for example, the host display 58 of the host computing device 14 and the client displays 62, 64 of the client computing devices.

Communication subsystem 1820 may be configured to communicatively couple computing system 1800 with one or more networks and/or one or more other computing devices. Communication subsystem 1820 may include wired and/or wireless communication devices compatible with one or more different communication protocols. As nonlimiting examples, the communication subsystem 1820 may be configured for communication via a wireless telephone network, a wireless local area network, a wired local area network, a wireless wide area network, a wired wide area network, etc.

The term "program" may be used to describe an aspect of the presentation system 10 that is implemented to perform one or more particular functions. In some cases, such a program may be instantiated via logic subsystem 1804 executing instructions held by storage subsystem 1808. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense. The specific routines or methods described herein may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

It will also be appreciated that references to "one example" or "an example" are not intended to be interpreted as excluding the existence of additional examples that also incorporate the recited features. Unless explicitly stated to the contrary, examples "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," and "second," etc. are used merely as labels, and are not intended to impose numerical requirements or a particular positional order on their objects.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. In a host computing device, a method for delivering a presentation via a closed wireless network, the method comprising:
    establishing a wireless network access point that creates the closed wireless network;
    establishing an encrypted communication session via the closed wireless network with a plurality of client computing devices and another client computing device, each of the client computing devices comprising a client display;
    running a virtual network server on the host computing device;
    communicatively coupling each of the client computing devices to the virtual network server;
    sending a first resource locator to the plurality of client computing devices, wherein the first resource locator includes a first network location of a first audio/video file stored on the host computing device;
    receiving a request for the first resource locator from the plurality of client computing devices;
    in response to receiving the request, streaming first audio/video data from the first audio/video file to the plurality of client computing devices, wherein the first audio/video data is configured to modify the client display of each of the client computing devices;
    sending a second resource locator to the other client computing device, wherein the second resource locator includes a network location of a second audio/video file stored on the host computing device;
    receiving a request for the second resource locator from the other client computing device; and
    in response to receiving the request from the other client computing device, streaming second audio/video data from the second audio/video file to the other client computing device, wherein the second audio/video data is configured to modify the client display of the other client computing device.

2. The method of claim 1, wherein streaming the first audio/video data from the first audio/video file to the plurality of client computing devices further comprises streaming the first audio/video data asynchronously to two or more of the plurality of client computing devices.

3. The method of claim 1, further comprising:
    selecting a subset of the plurality of client computing devices; and
    streaming the first audio/video data to only the subset of the plurality of client computing devices.

4. The method of claim 1, further comprising selectively enabling one or more of the plurality of client computing devices to control or interrupt the streaming of the first audio/video data.

5. The method of claim 1, further comprising:
    receiving shared audio/video data from a sharing client computing device of the plurality of client computing devices; and
    streaming the shared audio/video data from the sharing client computing device to one or more of the plurality of client computing devices.

6. The method of claim 1, further comprising:
    freezing the client display of one or more of the plurality of client computing devices.

7. A computer readable memory device comprising instructions executable by a processor of a host computing device to deliver a presentation via a closed wireless network, the instructions being executable to:
    establish a wireless network access point that creates the closed wireless network;
    establish an encrypted communication session via the closed wireless network with a plurality of client computing devices and another computing device, each of the client computing devices comprising a client display;
    run a virtual network server on the host computing device;
    communicatively couple each of the client computing devices to the virtual network server;
    send a first resource locator to the plurality of client computing devices, wherein the first resource locator includes a first network location of a first audio/video file stored on the host computing device;
    receive a request for the first resource locator from the plurality of client computing devices; and
    in response to receiving the request, stream first audio/video data from the first audio/video file to the plurality of client computing devices, wherein the first audio/video data is configured to modify the client display of each of the client computing devices;
    send a second resource locator to the other client computing device, wherein the second resource locator includes a network location of a second audio/video file stored on the host computing device;
    receive a request for the second resource locator from the other client computing device; and
    in response to receiving the request from the other client computing device, stream the second audio/video data from the second audio/video file to the other client computing device, wherein the second audio/video data is configured to modify the client display of the other client computing device.

8. The computer readable memory device of claim 7, wherein the instructions are executable to stream the first audio/video data from the first audio/video file asynchronously to two or more of the plurality of client computing devices.

9. The computer readable memory device of claim 7, wherein the instructions are executable to:
select a subset of the plurality of client computing devices; and
stream the first audio/video data to only the subset of the plurality of client computing devices.

10. The computer readable memory device of claim 7, wherein the instructions are executable to selectively enable one or more of the plurality of client computing devices to control or interrupt the streaming of the first audio/video data.

11. The computer readable memory device of claim 7, wherein the instructions are executable to:
receive shared audio/video data from a sharing client computing device of the plurality of client computing devices; and
stream the shared audio/video data from the sharing client computing device to one or more of the plurality of client computing devices.

12. The computer readable memory device of claim 7, wherein the instructions are executable to freeze the client display of one or more of the plurality of client computing devices.

13. A presentation system, comprising:
two or more client computing devices each comprising a client display; and
a computer readable memory device comprising instructions executable by a processor of a host computing device to deliver a presentation via a closed wireless network, the instructions being executable to:
establish a wireless network access point that creates the closed wireless network;
establish an encrypted communication session via the closed wireless network with the two or more client computing devices;
run a virtual network server on the host computing device;
communicatively couple each of the two or more client computing devices to the virtual network server;
send a first resource locator to at least one of the two or more client computing devices, wherein the first resource locator includes a first network location of a first audio/video file stored on the host computing device;
receive a request for the first resource locator from the at least one of the two or more client computing devices;
in response to receiving the request, stream first audio/video data from the first audio/video file to the at least one of the two or more client computing devices;
wherein each of the two or more client computing devices further comprises a viewing program executed by a processor of each of the two or more client computing devices, wherein the viewing program is configured to:
receive the first audio/video data from the host computing device; and
display the first audio/video data on the client display of the client computing device;
send a second resource locator to another client computing device of the two or more client computing devices that does not receive the stream of the first audio/video data, wherein the second resource locator includes a network location of a second audio/video file stored on the host computing device;
receive a request for the second resource locator from the other client computing device; and
in response to receiving the request from the other client computing device, stream the second audio/video data from the second audio/video file to the other client computing device, wherein the second audio/video data is configured to modify the client display of the other client computing device.

14. The system of claim 13, wherein the instructions are executable to stream the first audio/video data from the first audio/video file asynchronously to two or more of the two or more client computing devices.

15. The system of claim 13, wherein the instructions are executable to:
select a subset of the two or more client computing devices; and
stream the first audio/video data to only the subset of the two or more client computing devices.

16. The system of claim 13, wherein the instructions are executable to selectively enable one or more of the two or more client computing devices to control or interrupt the streaming of the first audio/video data.

17. The system of claim 13, wherein the instructions are executable to:
receive shared audio/video data from a sharing client computing device of the plurality of client computing devices; and
stream the shared audio/video data from the sharing client computing device to one or more of the two or more client computing devices.

18. The system of claim 13, wherein the instructions are executable to freeze the client display of one or more of the two or more client computing devices.

* * * * *